(12) United States Patent
Plante et al.

(10) Patent No.: US 10,788,085 B2
(45) Date of Patent: Sep. 29, 2020

(54) MAGNETORHEOLOGICAL FLUID CLUTCH APPARATUS AND CONTROL SYSTEMS

(71) Applicant: SOCIETE DE COMMERCIALISATION DES PRODUITS DE LA RECHERCHE APPLIQUÉE SOCPRA SCIENCES ET GÉNIE S.E.C, Sherbrooke (CA)

(72) Inventors: Jean-Sebastien Plante, Sherbrooke (CA); Marc Denninger, Sherbrooke (CA); Patrick Chouinard, Sherbrooke (CA); Guifre Julio, Sherbrooke (CA); Jean-Philippe Lucking Bigue, Sherbrooke (CA); Nicolas Huppe, Sherbrooke (CA); Jean-Francois Desrosiers, Mont-St-Hilaire (CA); Raphael Pilon, Cantons de Hatley (CA); Alexandre Landry-Blais, Cantons de Hatley (CA)

(73) Assignee: SOCIETE DE COMMERCIALISATION DES PRODUITS DE LA RECHERCHE APPLIQUEE SOCPRA SCIENCES ET GENIE S.E.C., Sherbrooke (CA)

( * ) Notice: Subject to any disclaimer, the term of this patent is extended or adjusted under 35 U.S.C. 154(b) by 225 days.

(21) Appl. No.: 15/996,020

(22) Filed: Jun. 1, 2018

(65) Prior Publication Data
US 2018/0340579 A1    Nov. 29, 2018

Related U.S. Application Data

(63) Continuation-in-part of application No. 15/107,763, filed as application No. PCT/CA2015/050074 on Feb. 2, 2015, now Pat. No. 10,012,273.

(Continued)

(51) Int. Cl.
*F16D 37/00* (2006.01)
*F16D 27/14* (2006.01)
(Continued)

(52) U.S. Cl.
CPC ............ *F16D 37/008* (2013.01); *B64C 27/08* (2013.01); *B64C 27/56* (2013.01); *B64C 27/605* (2013.01);
(Continued)

(58) Field of Classification Search
CPC ......... B64C 13/28; B64C 27/08; B64C 27/12; B64C 27/56; B64C 27/605; B64C 27/64;
(Continued)

(56) References Cited

U.S. PATENT DOCUMENTS 2,886,151 A    5/1959   Winslow
3,221,849 A   12/1965   Klass et al.
(Continued)

FOREIGN PATENT DOCUMENTS

EP    0 909 901 A1    4/1999

*Primary Examiner* — Jacob S. Scott
(74) *Attorney, Agent, or Firm* — Norton Rose Fulbright Canada LLP

(57) ABSTRACT

A magnetorheological fluid clutch apparatus comprises an input rotor adapted to be coupled to a power input, the input rotor having a first set of at least one input shear surface, and a second set of at least one output shear surface. An output rotor is rotatably mounted about the input rotor for rotating about a common axis with the input rotor, the output rotor having a first set of at least one output shear surface, and a second set of at least one output shear surface, the first sets of the input rotor and the output rotor separated by at least a first annular space and forming a first transmission set, the second sets of the input rotor and the output rotor separated by at least a second annular space and forming a second transmission set. Magnetorheological fluid is in each of the (Continued)

annular spaces, the MR fluid configured to generate a variable amount of torque transmission between the sets of input rotor and output rotor when subjected to a magnetic field. A pair of electromagnets are configured to deliver a magnetic field through the MR fluid, the electromagnets configured to vary the strength of the magnetic field, whereby actuation of at least one of the pair of electromagnets results in torque transmission from the at least one input rotor to the output rotor.

18 Claims, 17 Drawing Sheets

Related U.S. Application Data

(60) Provisional application No. 61/934,141, filed on Jan. 31, 2014.

(51) Int. Cl.
| | |
|---|---|
| *B64C 27/08* | (2006.01) |
| *B64C 27/56* | (2006.01) |
| *B64C 27/605* | (2006.01) |
| *B64C 27/78* | (2006.01) |
| *B64D 35/02* | (2006.01) |
| *B64D 35/04* | (2006.01) |
| *F16D 37/02* | (2006.01) |
| *B64C 13/28* | (2006.01) |
| *B64C 27/12* | (2006.01) |
| *B64C 27/64* | (2006.01) |
| *B64C 27/68* | (2006.01) |
| *B64D 31/14* | (2006.01) |

(52) U.S. Cl.
CPC .............. *B64C 27/78* (2013.01); *B64D 35/02* (2013.01); *B64D 35/04* (2013.01); *F16D 27/14* (2013.01); *F16D 37/02* (2013.01); *B64C 13/28* (2013.01); *B64C 27/12* (2013.01); *B64C 27/64* (2013.01); *B64C 27/68* (2013.01); *B64D 31/14* (2013.01); *F16D 2037/001* (2013.01); *F16D 2037/007* (2013.01)

(58) Field of Classification Search
CPC ......... B64C 27/68; B64C 27/78; B64D 31/14; B64D 35/02; B64D 35/04
See application file for complete search history.

(56) References Cited

U.S. PATENT DOCUMENTS

| | | |
|---|---|---|
| 6,183,386 B1 | 2/2001 | Duggan |
| 6,527,661 B2 | 3/2003 | Leeper |
| 8,127,907 B1 | 3/2012 | White et al. |
| 2008/0135367 A1 | 6/2008 | Steinwender |
| 2012/0085613 A1 | 4/2012 | Bose et al. |
| 2014/0299434 A1 | 10/2014 | Lull et al. |

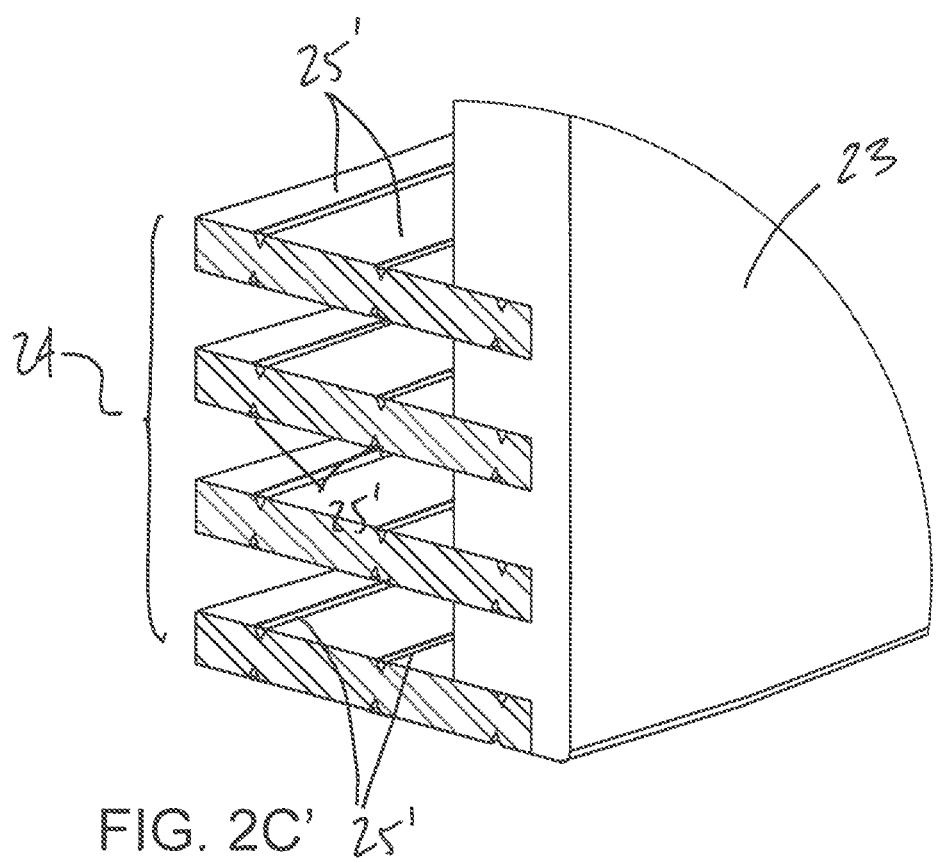

MAGNETORHEOLOGICAL FLUID CLUTCH APPARATUS AND CONTROL SYSTEMS

CROSS-REFERENCE TO RELATED APPLICATION

The present application is a continuation-in-part of U.S. patent application Ser. No. 15/107,763 filed on Jun. 23, 2016, which is a 371 of international application No. PCT/CA2015/050074 filed on Feb. 2, 2015, and claiming the priority of U.S. Patent Application No. 61/934,141, filed on Jan. 31, 2014.

TECHNICAL FIELD

This invention relates generally to magnetorheological (MR) fluid clutch apparatuses, and more particularly, to configurations of such apparatus for various applications.

BACKGROUND

Magnetorheological (MR) fluid clutch apparatuses are known as useful apparatuses for transmitting motion from a drive shaft with precision and accuracy, among other advantages. Accordingly, an increasing number of applications consider the use of MR fluid clutch apparatuses. For this purpose, it is desirable to modify existing MR fluid clutch apparatuses to bring them to safety standards of their given applications, for instance in terms of redundancy.

SUMMARY

It is an aim of the present disclosure to provide magnetorheological (MR) fluid clutch apparatuses that addresses issues associated with the prior art.

It is a further aim of the present disclosure to provide novel control systems with magnetorheological (MR) fluid clutch apparatuses.

Therefore, in accordance with a first embodiment of the present disclosure, there is provided a magnetorheological fluid clutch apparatus comprising: at least one input rotor adapted to be coupled to a power input, the input rotor having a first set of at least one input shear surface, and a second set of at least one output shear surface; an output rotor rotatably mounted about the input rotor for rotating about a common axis with the input rotor, the output rotor having a first set of at least one output shear surface, and a second set of at least one output shear surface, the first sets of the input rotor and the output rotor separated by at least a first annular space and forming a first transmission set, the second sets of the input rotor and the output rotor separated by at least a second annular space and forming a second transmission set; magnetorheological fluid in each of the annular spaces, the MR fluid configured to generate a variable amount of torque transmission between the sets of input rotor and output rotor when subjected to a magnetic field; and a pair of electromagnets, with a first electromagnet associated with the first transmission set, and a second electromagnet associated with the second transmission set, the electromagnets configured to deliver a magnetic field through the MR fluid, the electromagnets configured to vary the strength of the magnetic field; whereby actuation of at least one of the pair of electromagnets results in torque transmission from the at least one input rotor to the output rotor.

Further in accordance with the first embodiment, each of the first set of input shear surface and the second set of input shear surfaces are part of first input drums and second input drums, and further wherein at least one of each of the output shear surfaces are part of first output drums and second output drums, the input and output shear surfaces of each of the transmission sets being intertwined.

Still further in accordance with the first embodiment, the at least first annular space is part of a first magnetorheological fluid chamber, and further wherein the at least second annular space is part of a second magnetorheological fluid chamber.

Still further in accordance with the first embodiment, each of the magnetorheological fluid chambers has an expansion system.

Still further in accordance with the first embodiment, the expansion system comprises at least one flexible member on an exterior of the output rotor forming an expansion pocket in fluid communication with one of the magnetorheological fluid chambers.

Still further in accordance with the first embodiment, each of the electromagnets comprises at least two independent coils.

Still further in accordance with the first embodiment, one of the input drums and the output drums has a helical channel in at least one of its surfaces facing the annular space, the annular space being in fluid communication with a fluid chamber space, whereby the helical channel induces a flow of the magnetorheological fluid between the annular space and the fluid chamber space when the input rotor rotates.

Still further in accordance with the first embodiment, the fluid chamber space is separated from the annular space by at least one hole in a radial wall of the input drums.

Still further in accordance with the first embodiment, the at least one input rotor comprises two input rotors, with a first of the input rotors associated with the first transmission set and a second of the input rotors associated with the second transmission set.

Still further in accordance with the first embodiment, the first of the input rotors receives a clockwise input, and further wherein the second of the input rotors receives a counterclockwise input.

Still further in accordance with the first embodiment, the first of the input rotors receives a rotating input, and further wherein the second of the input rotors is fixed.

Still further in accordance with the first embodiment, the pair of electromagnets share a common core, the common core being fixed to the output rotor.

In accordance with a second embodiment of the present disclosure, there is provided a magnetorheological fluid clutch apparatus comprising: at least one input rotor adapted to be coupled to a power input, the input rotor having at least a first set of at least one input drum; an output rotor rotatably mounted about the input rotor for rotating about a common axis with the input rotor, the output rotor having at least a first set of at least one output shear surface, the first sets of the input rotor and the output rotor separated by at least a first annular space and forming a first transmission set; a fluid chamber space being in fluid communication with the annular space, at least one surface depression channel in a surface of one of the at least one input drum and the at least one output shear surface facing the annular space; magnetorheological fluid in the annular space, the MR fluid configured to generate a variable amount of torque transmission between the sets of input rotor and output rotor when subjected to a magnetic field; and at least one electromagnet configured to deliver a magnetic field through the MR fluid, the at least one electromagnet configured to vary the strength of the magnetic field whereby actuation of the at least one electromagnets resulting in torque transmission from the at least one input rotor to the output rotor; whereby the surface depression induces a flow of the magnetorheological fluid between the annular space and the fluid chamber space when the input rotor rotates.

Further in accordance with the second embodiment, each of the first set of at least one input drums comprises a plurality of the input drums, and wherein at least one of the output shear surfaces is part of a first output drum, the input drum and output shear surfaces being intertwined.

Still further in accordance with the second embodiment, the at least first annular space is part of a first magnetorheological fluid chamber.

Still further in accordance with the second embodiment, wherein the magnetorheological fluid chamber has an expansion system.

Still further in accordance with the second embodiment, the expansion system comprises at least one flexible member on an exterior of the output rotor forming an expansion pocket in fluid communication with the magnetorheological fluid chamber.

Still further in accordance with the second embodiment, the at least one electromagnet comprises at least two independent coils.

Still further in accordance with the second embodiment, the at least one input rotor receives an axial power input, and the output rotor has one of an axially-positioned connector and a radial connector for transmitting a power output.

Still further in accordance with the second embodiment, the at least one input rotor comprises two input rotors, with a first of the input rotors associated with the first transmission set and a second of the input rotors associated with a second transmission set.

Still further in accordance with the second embodiment, the first of the input rotors receives a rotating input, and further wherein the second of the input rotors is fixed.

Still further in accordance with the second embodiment, the at least one surface depression is at least one helical channel.

In accordance with a third embodiment of the present disclosure, there is provided an actuation system comprising: four power sources each producing one degree of rotational power; a first power shaft connected to two of the power sources for receiving the degrees of rotational power for rotating in a first orientation, with one of the two degrees of rotational power being redundant; a second power shaft connected to two other of the power sources for receiving the degrees of rotational power in a second orientation opposite to the first orientation, with one of the two degrees of rotational power being redundant; at least one magnetorheological fluid clutch apparatus on the first power shaft and actuatable to output at least partially rotational power in the first orientation received from the first power shaft; at least one magnetorheological fluid clutch apparatus on the second power shaft and actuatable to output at least partially rotational power in the second orientation received from the second power shaft; and at least one linkage connected to the magnetorheological fluid clutch apparatuses on the first power shaft and on the second power shaft to move reciprocatingly upon actuation of the magnetorheological fluid clutch apparatuses.

Further in accordance with the third embodiment, a plurality of the magnetorheological fluid clutch apparatuses are on the first power shaft and on the second power shaft, with pairs of one magnetorheological fluid clutch apparatus on the first power shaft and one magnetorheological fluid clutch apparatus on the second power shaft being formed and interconnected by a respective one of the linkages.

Still further in accordance with the third embodiment, unidirectional clutches are provided between each of the power sources and a respective one of the power shafts.

Still further in accordance with the third embodiment, right-angle gearboxes are between each of the power sources and a respective one of the power shafts.

Still further in accordance with the third embodiment, the four power sources are produced by two motors, each motor having two drive shafts.

Still further in accordance with the third embodiment, the four power sources are produced by four motors.

In accordance with a fourth embodiment of the present disclosure, there is provided an actuation system comprising: at least one power source producing one degree of rotational power; a power shaft connected to the power source for receiving the degree of rotational power for rotating in a first orientation; at least a pair of magnetorheological fluid clutch apparatuses on the power shaft and each actuatable to output at least partially rotational power received from the power shaft via an output arm; and at least one linkage having an output end, a first sublinkage extending from the output end to a first joint with the output arm of one of the magnetorheological fluid clutch apparatuses of the pair, a second sublinkage extending from the output end to a second joint with the output arm of the other of the magnetorheological fluid clutch apparatuses of the pair, the first joint and the second joint being on opposite sides of a plane passing through an axis of the power shaft and the output end; whereby the output end moves reciprocatingly upon actuation of the magnetorheological fluid clutch apparatuses.

Further in accordance with the fourth embodiment, a plurality of pairs of magnetorheological fluid clutch apparatuses are provided, each said pair having one linkage, the pairs sharing the power shaft.

Still further in accordance with the fourth embodiment, the power source is a single motor.

In accordance with a fifth embodiment of the present disclosure, there is provided an actuation system comprising: two rotary units, each rotary unit comprising: a power source producing one degree of rotational power; a magnetorheological fluid clutch apparatus receiving the rotational power from the power source and actuatable to output at least partially rotational power received from the power source; and at least a shared output arm connected to the magnetorheological fluid clutch apparatus of both of the rotary units, the shared output arm moving upon actuation of either or both of the magnetorheological fluid clutch apparatuses.

Further in accordance with the fifth embodiment, a gearbox is in each of the rotary units between the power source and the magnetorheological fluid clutch apparatus.

Still further in accordance with the fifth embodiment, one of the rotary units causes a clockwise movement of the shared output arm, and the other of the rotary units causes a counterclockwise movement of the shared output arm.

Still further in accordance with the fifth embodiment, the power sources of each said rotary unit is a bidirectional power source.

In accordance with a sixth embodiment of the present disclosure, there is provided an actuation system comprising: at least two independent rotary units, each rotary unit comprising a power source producing one degree of rotational power; a magnetorheological fluid clutch apparatus receiving the rotational power from the power source and actuatable to output at least partially rotational power received from the power source; a linkage connected to the magnetorheological fluid clutch apparatus to receive the output; and a shared rotary unit comprising: a shared power source producing one degree of rotational power; a power shaft receiving the rotational power from the shared power source; a magnetorheological fluid clutch apparatus for each of the at least two independent rotary units, and receiving the rotational power from the shared power source and actuatable to output at least partially rotational power received from the shared power source; wherein the linkages of each of the at least two independent rotary units is connected to a dedicated one of the magnetorheological fluid clutch apparatus of the shared rotary unit to receive rotational power from the shared rotary unit.

Further in accordance with the sixth embodiment, a gearbox is in each of the rotary units between the power source and the magnetorheological fluid clutch apparatus.

Still further in accordance with the sixth embodiment, one of independent rotary units produce a clockwise rotation, and the shared rotary unit produces a counterclockwise rotation.

Still further in accordance with the sixth embodiment, the independent rotary units and the shared rotary unit all produce rotation in a common orientation, with the degree of rotational power of the shared rotary unit being redundant.

Still further in accordance with the sixth embodiment, the power source of at least one said rotary unit is a bidirectional power source.

DETAILED DESCRIPTION OF THE DRAWINGS

Figure 1A:
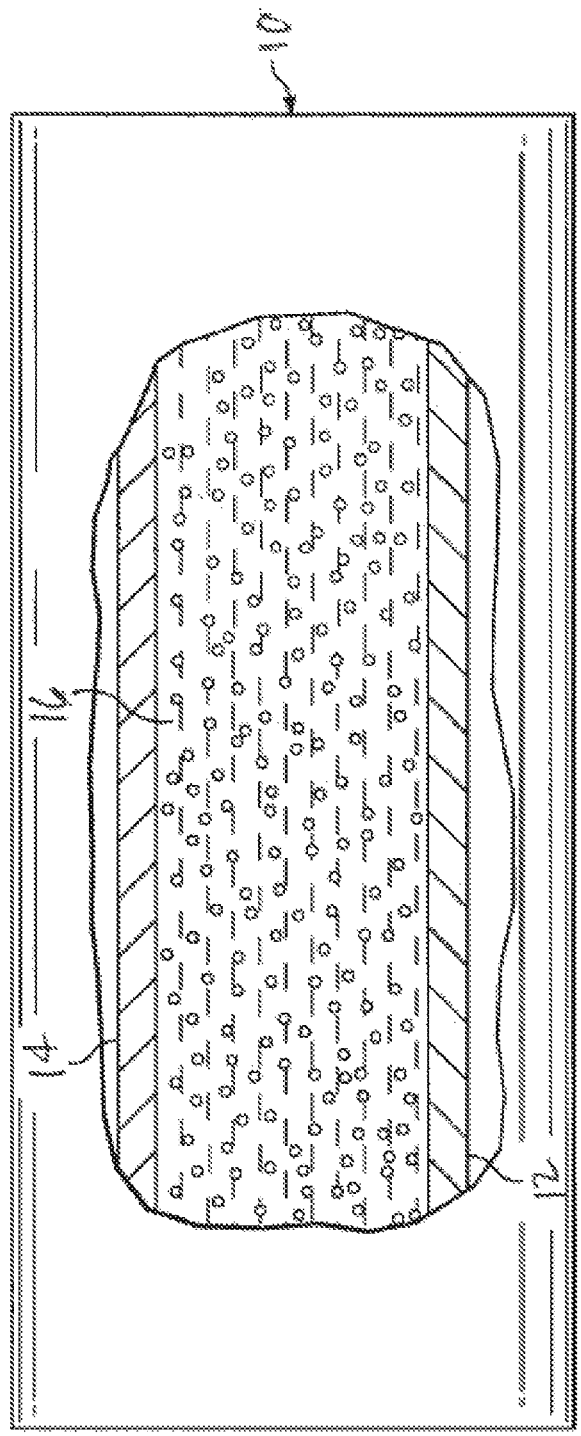
FIG. 1A shows a principle of operation of a magnetorheological (MR) fluid clutch apparatus according to one example embodiment, without a magnetic field.
Figure 1B:
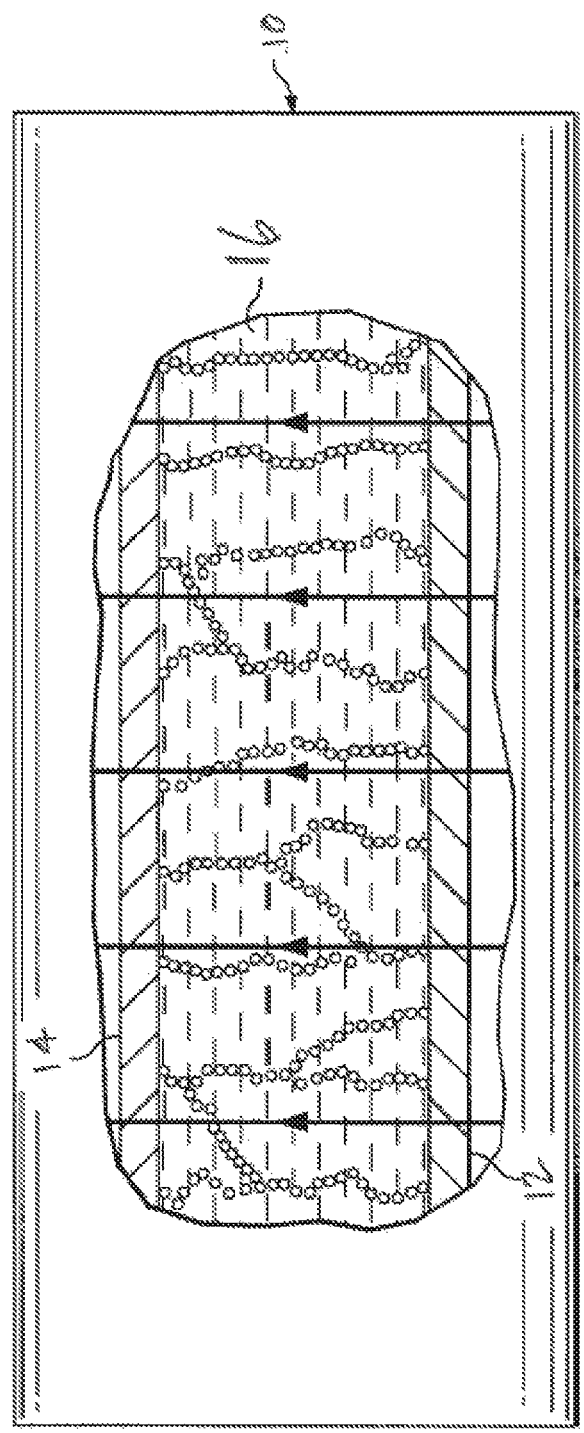
FIG. 1B shows the MR fluid clutch apparatus of FIG. 1A when subject to a suitable magnetic field.

Referring to the drawings and more particularly to FIGS. 1A and 1B, there is illustrated the principle of operation of a magnetorheological (MR) fluid clutch apparatus 10 configured to provide a mechanical output force based on a received input current.

As will be explained in greater detail below and in various configurations, a MR fluid clutch apparatus 10 may provide an output force in response to an input current received from an operator, to transmit an input force. For example, FIGS. 1A and 1B show example conceptual views of a MR fluid clutch apparatus 10 according to one example embodiment. The example MR fluid clutch apparatus 10 features driving member 12 and driven member 14 separated by gaps filled with an MR fluid 16. In the example of FIGS. 1A and 1B, the driving member 12 may be in mechanical communication with a power input, and driven member 14 may be in mechanical communication with a power output (i.e., force output, torque output). MR fluid 16 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces. The magnetic field intensity mainly affects the yield shear stress of the MR fluid. The yield shear stress of the fluid when in its active ("on") state may be controlled by varying the magnetic field intensity produced by electromagnets (not shown in FIGS. 1A and 1B), i.e., the input current, via the use of a controller. Accordingly, the MR fluid's ability to transmit force can be controlled with an electromagnet, thereby acting as a clutch between the members 12 and 14. The electromagnet unit is configured to vary the strength of the magnetic field such that the friction between the members 12 and 14 is low enough to allow the driving member 12 to freely rotate with the driven member 14 and vice versa.

FIG. 1A shows MR fluid clutch apparatus 10 when the MR fluid 16 is subject to little or no magnetic flux, whereas FIG. 1B shows MR fluid clutch apparatus 10 when the MR fluid 16 is subject to a larger magnetic flux. Accordingly, the example of FIG. 1A may allow relatively independent movement between members 12 and 14, whereas the example of FIG. 1B may restrict movement between members 12 and 14. Accordingly, MR fluid clutch apparatus 10 may vary the amount of force provided in response to a received input by changing the amount of magnetic flux to which is exposed the MR fluid 16. In particular, the MR fluid clutch apparatus 10 may provide an output force based on the input force by changing the amount of magnetic flux based on the input force. In addition, the MR fluid clutch apparatus 10 may be less prone to component failures than some other clutches because MR fluid 16 may involve lower friction between members 12 and 14 than conventional clutches.

Figure 2A:
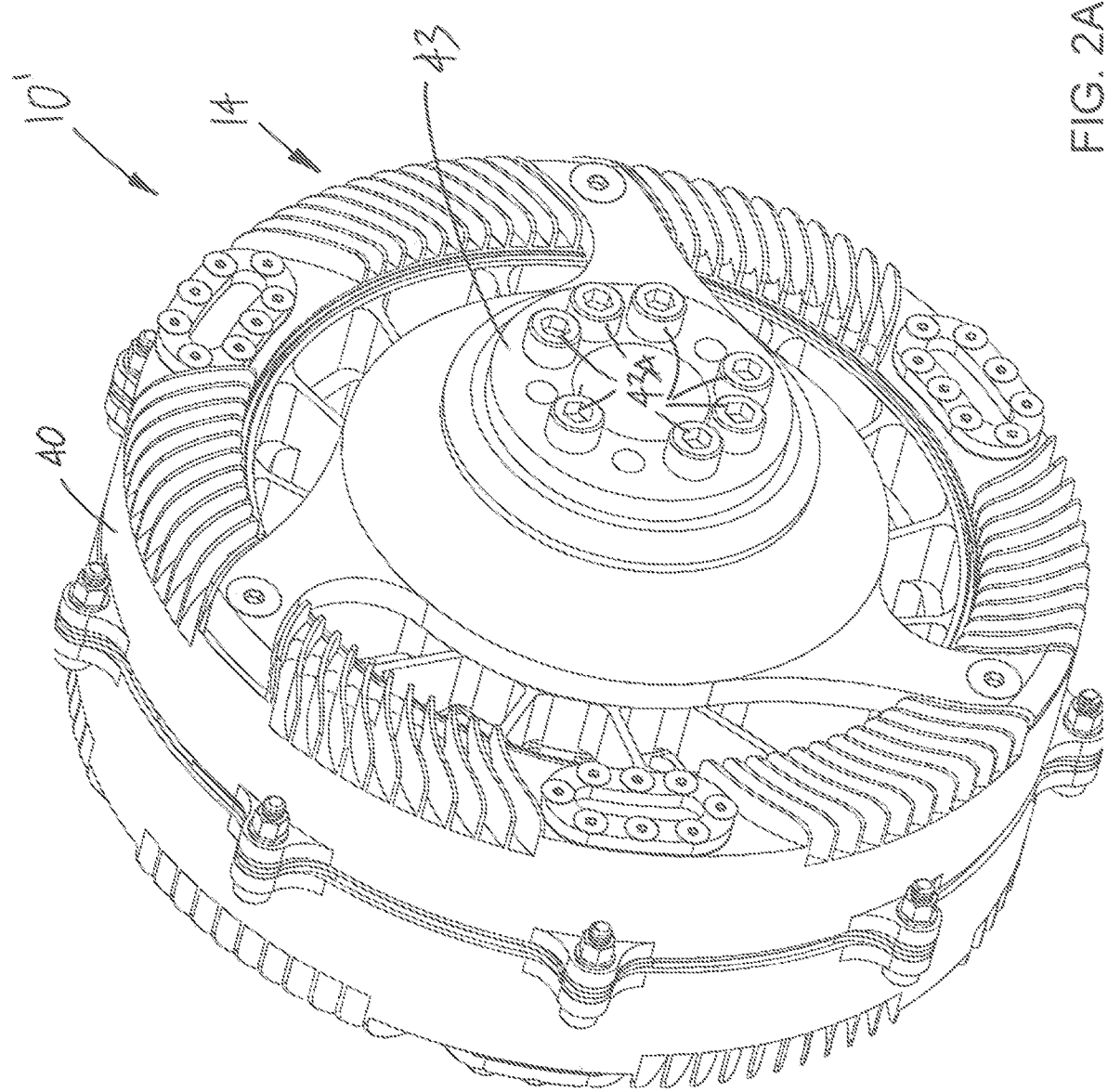
FIG. 2A shows a perspective view of a MR fluid clutch apparatus in accordance with an embodiment of the present disclosure, for axial input and output for axial shaft.
Figure 2B:
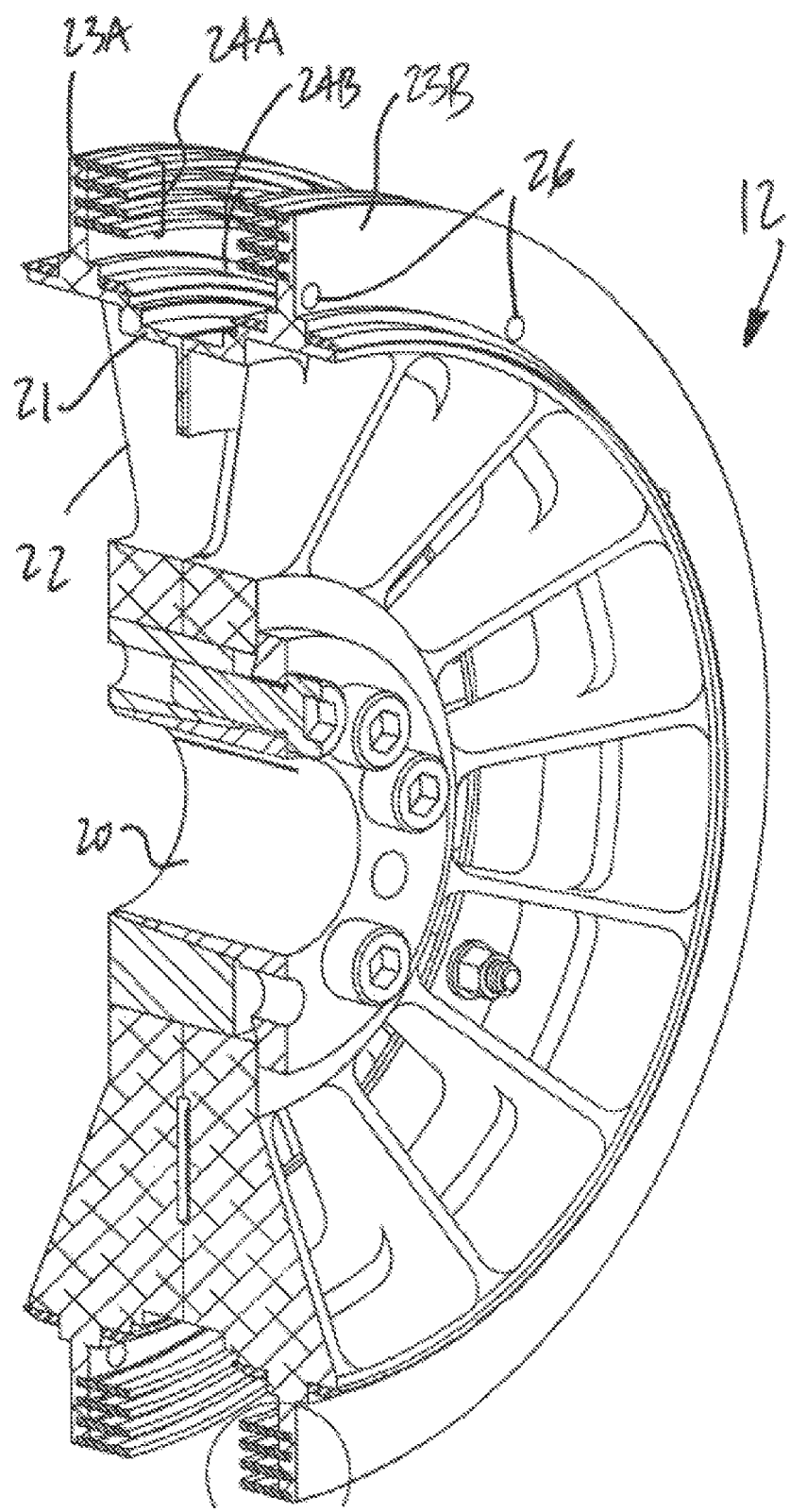
FIG. 2B is a sectioned perspective view of an input rotor of the MR fluid clutch apparatus of FIG. 2A.
Figure 2C:
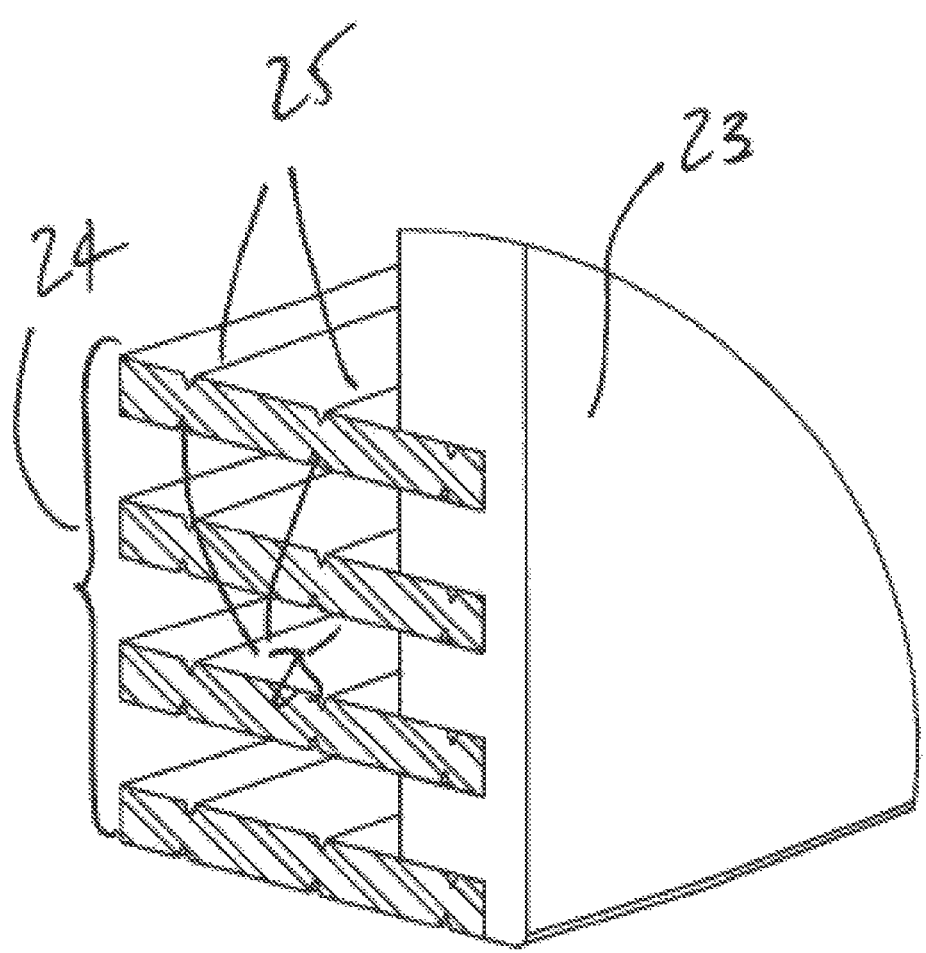
FIG. 2C is an enlarged perspective view of a helical channel for drum of the input rotor of FIG. 2B.
Figure 2D:
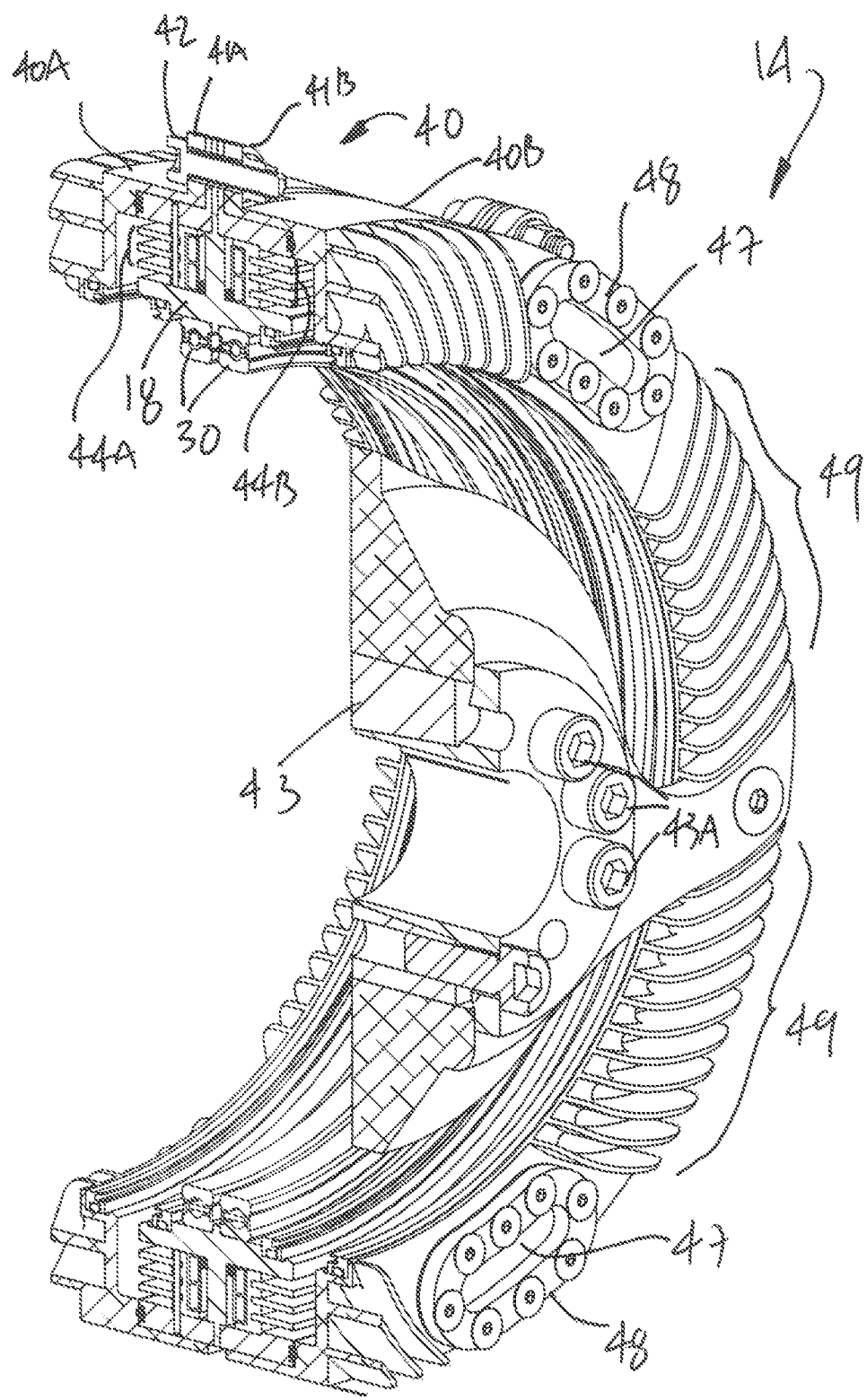
FIG. 2D is a sectioned perspective view of an output rotor of the MR fluid clutch apparatus of FIG. 2A.
Figure 2E:
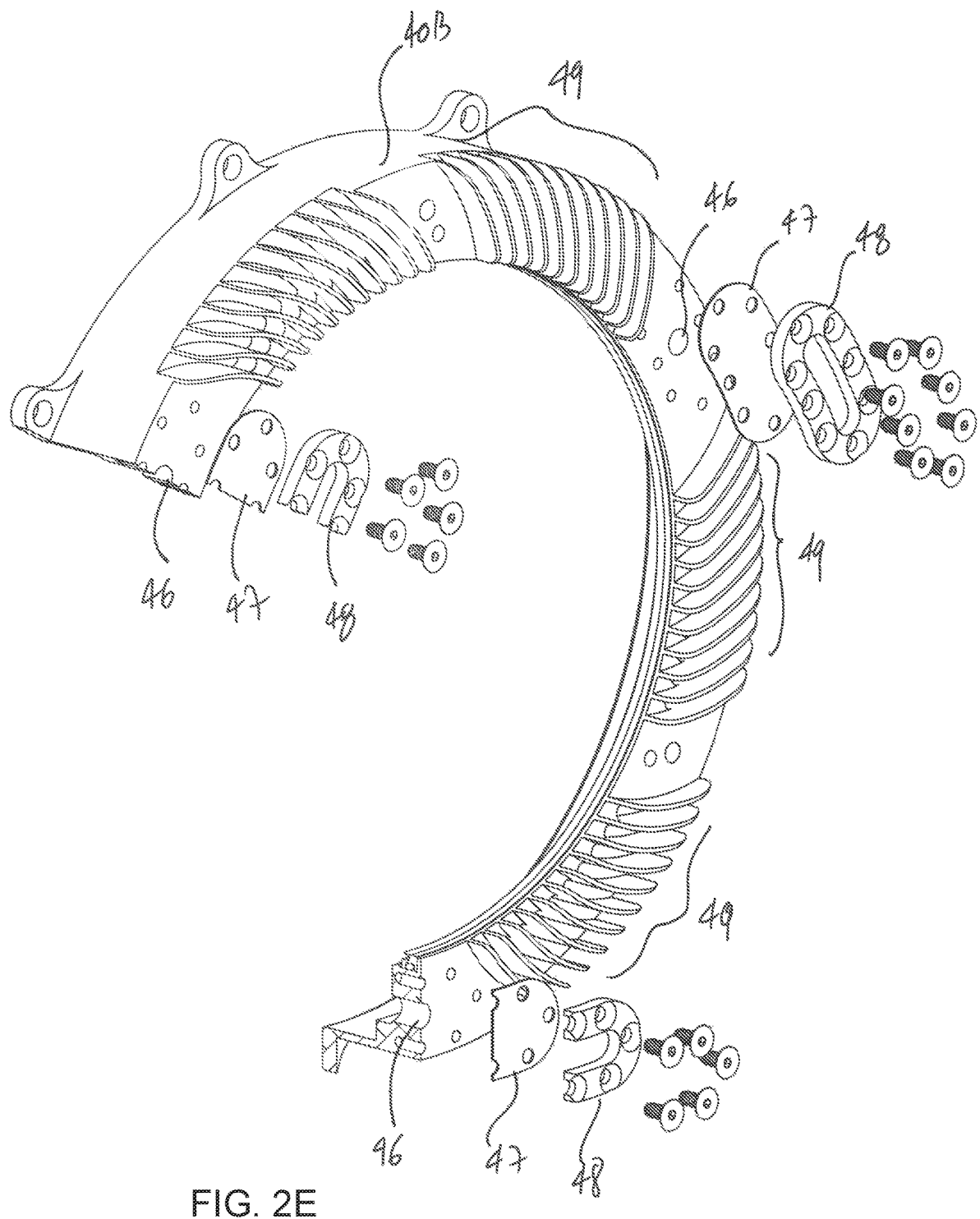
FIG. 2E is a sectioned assembly view of an output casing of the output rotor of FIG. 2D
Figure 2F:
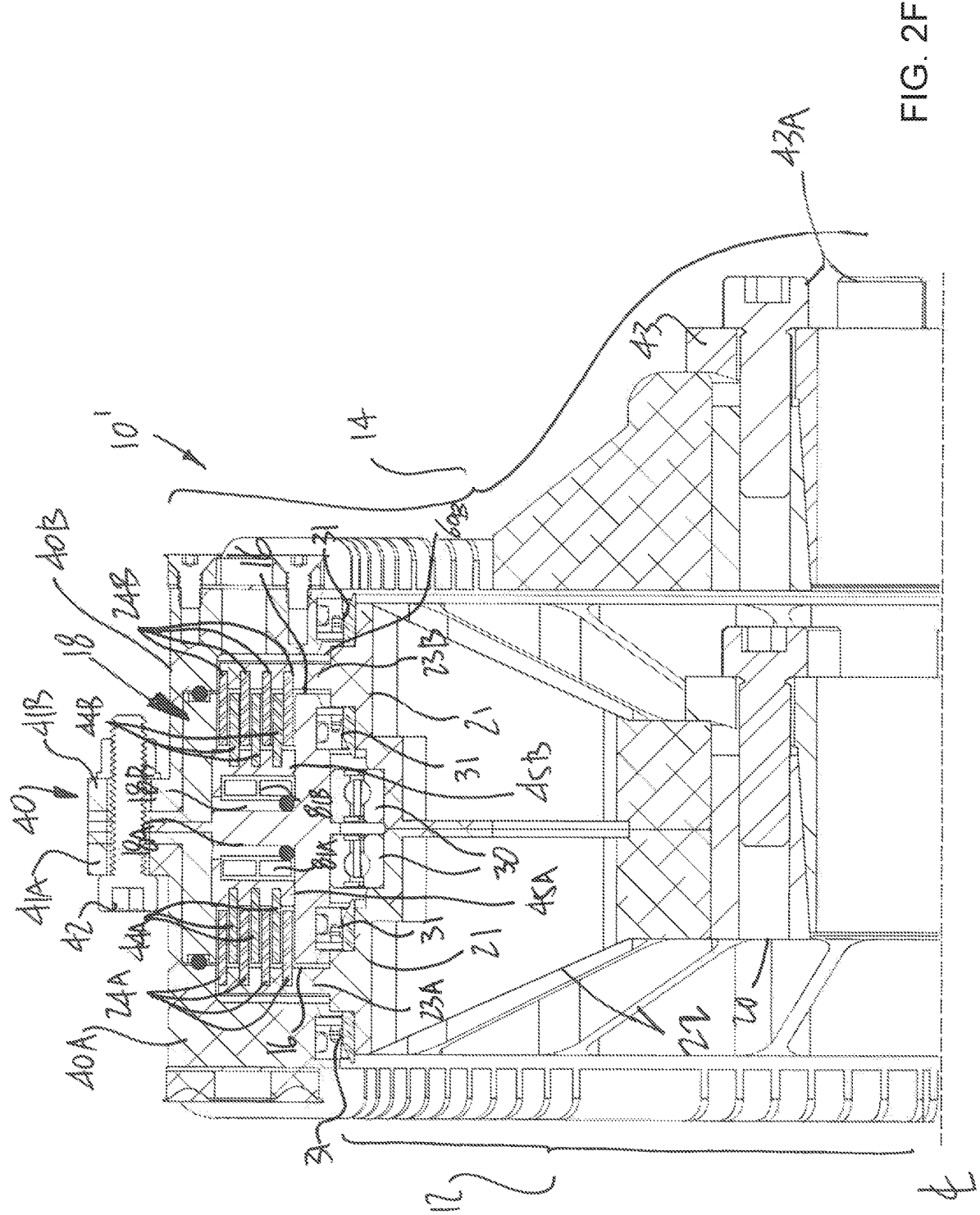
FIG. 2F is an enlarged cross-section view of the MR fluid clutch apparatus of FIG. 2A.
Figure 2G:
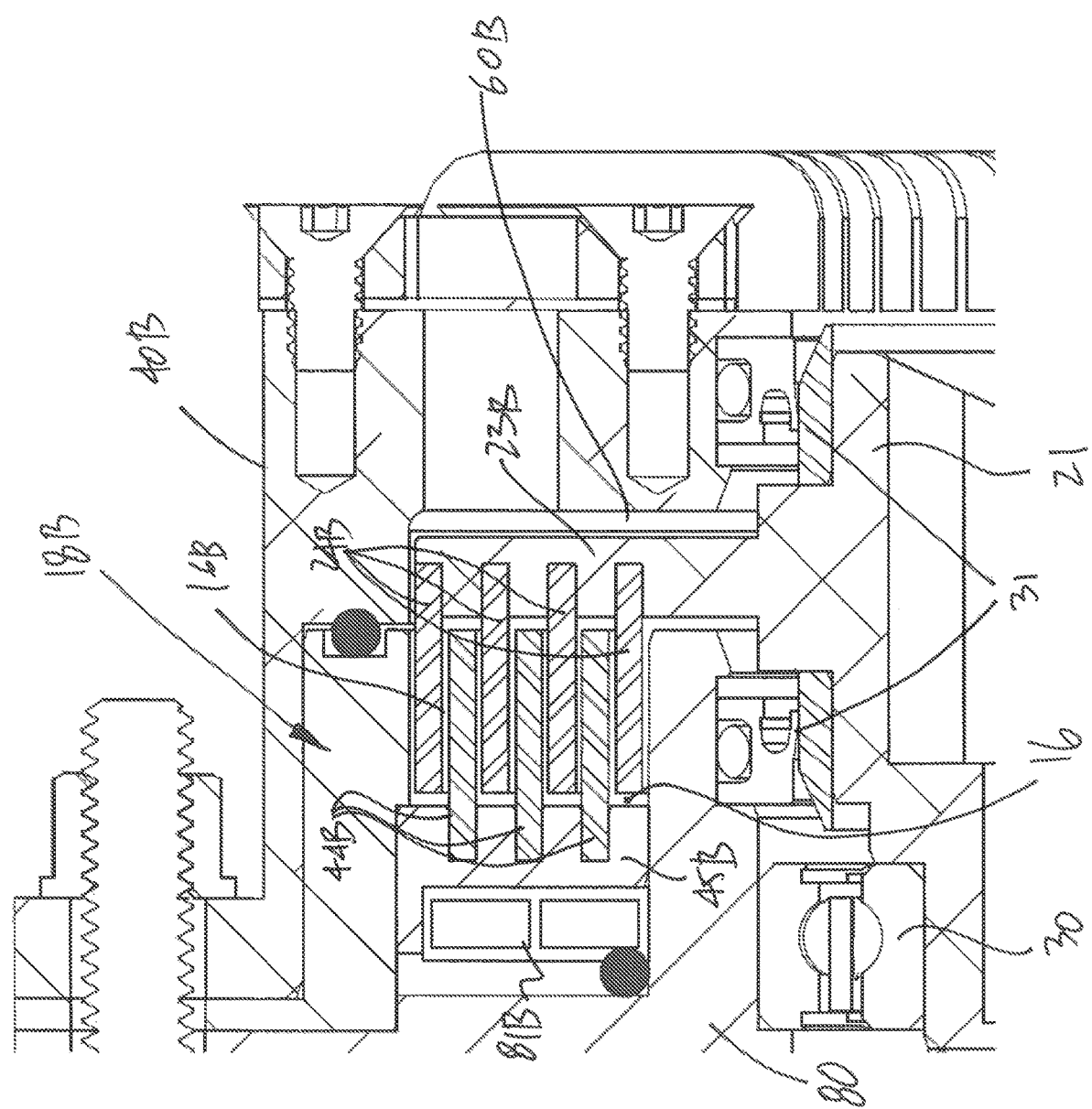
FIG. 2G is further enlarged view of the cross-section view of FIG. 2F, focusing on drum interrelation.

FIGS. 2A to 2J show an embodiment of the MR fluid clutch apparatus at 10', providing additional detail over the system 10 of FIGS. 1A and 1B. FIG. 2A shows a perspective view of the MR fluid clutch apparatus 10'. FIGS. 2B and 2C show the driving member 12, while FIGS. 2D and 2E show the driven member 14 separate from one another. FIG. 2F shows a cross-section view of the MR fluid clutch apparatus 10' of FIG. 2A. FIG. 2G shows a detailed view of the cross section view of FIG. 2F.

The MR fluid clutch apparatus 10' features the driving member 12, the driven member 14, and an electromagnet unit 18 that is secured to the driven member 14, with MR fluid 16 disposed between the driving member 12 and the driven member 14. In the example of FIGS. 2A-2J, the driving member 12 is represented by an input rotor having a hub 20, by which the driving member 12 may be connected to a shaft or like rotational power input. Therefore, the driving member 12 may receive rotational energy (torque) from a power device, such as a motor. The driving member 12 further comprises an annular rim 21, supported radially about the hub 20 by way of spokes 22. This is one possible configuration, as the annular rim 21 may be connected to the hub 20 by way of a disc, or other arrangements. The driving member 12 rotates about axis CL.

A pair of flanges 23A and 23B (a.k.a., radial walls) project radially from the rim 21, although a single one of the flanges 23 could alternatively be present. The flanges 23A and 23B each has a plurality of concentric annular drums 24A or 24B, respectively. In the embodiment of FIGS. 2A to 2D, the flanges 23A and 23B are arranged to have their respective sets of annular drums 24A-B face each other, although other arrangements are considered as well. The annular drums 24A-B are secured to the flanges 23A-B. In an embodiment, concentric circular channels are defined (e.g., machined, cast, molded, etc) in the flanges 23A and 23B for insertion therein of the drums 24A/24B. A tight fit (e.g., force fit), an adhesive and/or radial pins may be used to secure the drums 24A/24B in their respective flanges 23A-23B. In the illustrated embodiment, the flanges 23A-B are monolithically connected to the hub 20, the annular rim 21 and the spokes 22, whereby the various components of the driving member 12 rotate concurrently when receiving the drive from the power source. As shown in FIG. 2C, a pumping feature in the form of helical channels 25 (ak.a., helical grooves) may be defined in one or more of the surfaces of the drums 24A and 24B. The channel 25 is said to be helical in that it has a varying axial dimension when one moves along the channel 25. The helical channel 25 constitutes a path for the MR fluid. Indeed, the channels 25 in the set of drums 24A and 24B causes a pumping action of the MR fluid 16 in the MR fluid chambers. Thus, an important portion of the MR fluid in the MR fluid chambers participates in the transmission of the torque, which helps to increase the life of the MR fluid clutch apparatus 10'. The channels are right-handed (or left-handed) on both annular surfaces of each drum comprised in the set of drums 24A and 24B. Some holes 26 (FIG. 2B) are present in the annular flanges 23A and 23B so that the internal MR fluid flow is possible, as explained hereinafter. The helical channels 25 result in the variation of the field conductive material in a spiral or helicoidal pattern across the MR fluid gap. The helical channels 25 may result from the removal of material (e.g., as cast or subsequently machined). Consequently, a magnetic field concentration is produced between the helical channels 25 on top of the annular drum surface, due to this variation. The field concentration generates a solid MR fluid structure when the MR fluid is magnetized, the solid MR fluid structure adopting the helical shape of the helical channels 25. The MR fluid located into the slightly magnetized zone radially aligned with the helical channels 25 is transported axially by the solid helical structures of MR fluid, in similar fashion to a feed screw. Accordingly, some magnetic pumping is achieved by the sharp variation of thickness of the field conductive material, resulting in the magnetic field concentration.

As shown in FIG. 2C', the pumping features 25' are also based on shaping the field conductive material in a spiral or helicoidal pattern across the MR fluid gap, though without the presence of surface discontinuities such as the helical channels 25. Stated differently, the pumping is not induced by mechanical action, but rather by magnetic field concentration. For example, a filler material 25' with a different field conductivity may be placed in the helical channels 25 for the surface to be substantially annular without discontinuities. For example, the filler material 25' may be epoxy. As an alternative embodiment, the filler material 25' could be a material of enhanced field conductivity to create the helical pattern. The pumping features 25/25' could be represented by one or more spirals for each drum, or for any one or more drum. It is also contemplated to having other shapes of magnetic field concentration (e.g., a dam)—not just spiral(s), to induce a pumping movement of the MR fluid.

Various bearings 30 are mounted to the driving member 12 and rotatably support the driven member 14, such that the driven member 14 may rotate when the clutch apparatus 10 is actuated to transmit the rotational movement, as described hereinafter. Seals 31 are also provided at the interface between the driving member 12 and driven member 14, to preserve the MR fluid 16 between the members 12 and 14. Moreover, the seals 31 are provided to prevent MR fluid from reaching the bearings 30 or to leak out of the apparatus 10'.

Also in this example, the driven member 14 is represented by an output casing 40, also referred to as output rotor, configured to rotate about axis CL as well. The output casing 40 may be coupled to various mechanical components that receive the transmitted power output when the clutch apparatus 10' is actuated to transmit at least some of the rotational power input. The output casing 40 has a first annular half 40A and a second annular half 40B, interconnected by respective flanges 41A and 41B and fasteners 42. A hub 43 is fixed to the second annular half 40B, so as to rotate with it. The driven member 14 is connected to mechanical components via the hub 43, whereby fasteners 43A are provided to couple the hub 43 to such mechanical components (not shown).

The driven member 14 also has a pair of sets of concentric annular drums 44A or 44B, respectively mounted to annular supports 45A and 45B, respectively. The annular supports 45A and 45B are secured to a core of electromagnet unit 18 as is described hereinafter (e.g., by press-fit, glue, dowel, etc). The annular drums 44A and 44B are spaced apart in such a way that the sets of annular drums 24A and 24B fit within the annular spaces between the annular drums 44A and 44B, in intertwined fashion. When either of both the driving member 12 and the driven member 14 rotate, there is no direct contact between the annular drums 24A and 24B, and the annular drums 44A and 44B, due to the concentricity of the annular drums 24A, 24B, 44A and 44B, about axis CL.

The annular spaces between the annular drums 24A of the driving member 12, and the annular drums 44A of the driven member 14 are filled with the MR fluid 16. Likewise, the annular spaces between the annular drums 24B of the driving member 12, and the annular drums 44B of the driven member 14 are filled with the MR fluid 16. However, the respective annular spaces (fluid chambers) are separated from one another, i.e., the MR fluid 16 may not flow from one of the annular space to the other. According to an embodiment, the annular spaces have a width of 0.25 mm+/−0.05 mm, between the facing surfaces of sets of drums 24A and 24B, i.e., in the radial direction. The annular spaces width range is provided only as a non-exclusive example, as other annular spaces widths are considered as well, taking into account various factors such as overall torque, part sizes, etc. The annular spaces between each set of drum 24 and 44 (i.e., one set of 24A and 44A, and the other set of 24B and 44B) are part of a MR fluid chamber sealed off by seals 31. The MR fluid clutch apparatus 10 has two MR fluid chambers, one for the drums 24A/44A and another associated with the drums 24B/44B. Therefore, if the MR fluid leaks out of one of the chambers, the other chamber may still be functional, thereby adding a redundancy.

As best seen in FIGS. 2D and 2E, the output casing 40 defines expansion systems for each of the MR fluid chambers, to compensate for pressure variations. According to an embodiment, the expansion systems comprises throughbores 46 in the casing 40. The throughbores 46 are in fluid communication with the MR fluid chambers, for MR fluid to pass therethrough. Flexible membranes 47 are secured to an exterior of the casing 40, opposite the throughbores 46, by way of brackets 48. Hence, the flexible membranes 47 may deform to create an expansion pocket. The holes 26 defined in the annular flanges 23A and 23B allow the MR fluid to flow out of the annular spaces between the set of drums 24A/44A, 24B/44B, to reach the expansion pockets. Fins 49 may also be provided on the outer surface of the casing 40 to assist in exhausting heat from the MR fluid in the MR fluid chambers.

The MR fluid chambers include the annular spaces between the set of drums 24A/44A, 24B/44B, in addition to space at the end of drum tips, and space between the drums 24A and 24B and shear surfaces that are part of the casing 40 or core 80. The MR fluid chambers may also include spaces 60A and 60B, located opposite the annular flanges 23A and 23B. According to an embodiment, as shown in FIG. 2J, a flow MRFF of the MR fluid is as follows. When the driving member 12 rotates, the helical channels 25 create some pumping action, by which the MR fluid 16 moves in a radial outward direction after reaching ends of drums 24 and 44. Upon going beyond the outermost drums 24, the MR fluid may be directed pass the radial edge of the annular flanges 23 and into the spaces 60. The MR fluid will move radially inward, to return to the annular spaces via the holes 26. The spaces 60 are in fluid communication with the expansion systems.

The movement of the MR fluid in the manner described above allows the MR fluid to cycle in the MR fluid chambers. The movement is achieved via the presence of the helical channels 25 on the surface of the drums 24. Other surface depressions could also be used on either one of the drums 24/44 to induce a pumping action in the MR fluid chambers, i.e., some form of cavity, protrusion or channel in an otherwise smooth cylindrical surface.

Figure 2H:
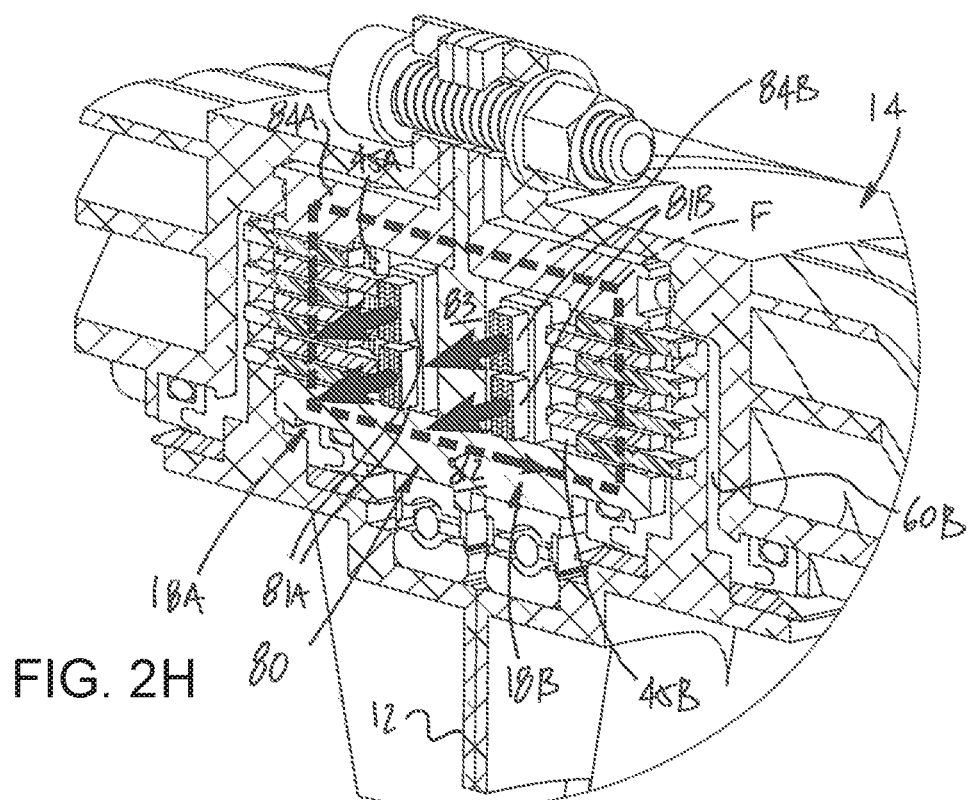
FIGS. 2H and 2I show example magnetic fields of the MR fluid clutch apparatus of FIGS. 2A-2G.
Figure 2I:
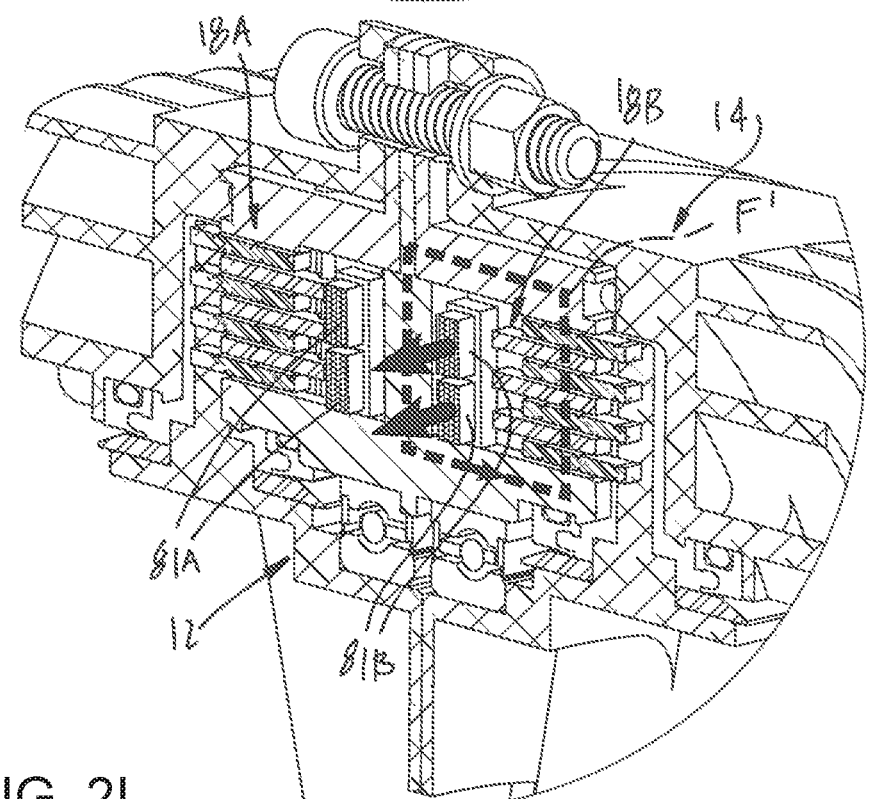
Figure 2J:
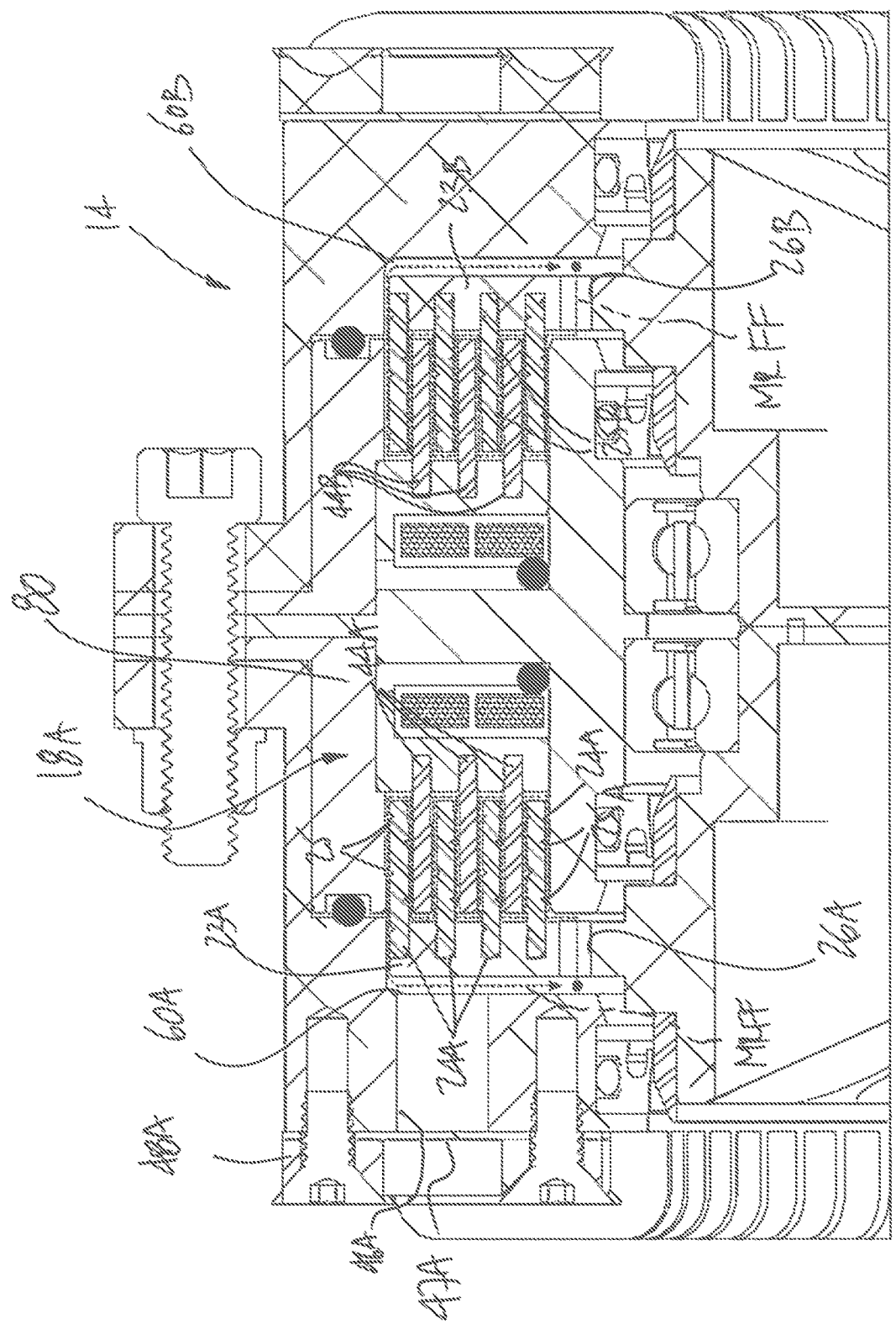
FIG. 2J is a sectioned view of the MR fluid clutch apparatus of FIGS. 2A-2G, showing a MR fluid flow.

Referring to FIGS. 2H-2J, the electromagnet unit 18 is fixed to the driven member 14 and therefore rotates with the driven member 14. The electromagnet unit 18 has a pair of electromagnets, 18A and 18B, sharing a core 80, although each of the electromagnets 18A and 18B could have its own core. Annular coil 81A and 81B are in the core 80, and are respectively part of the electromagnets 18A and 18B. The annular drums 44A and associated annular support 45A are in line with the electromagnet 18A and are secured to the core 80 and hence rotate with the core 80. Likewise, the annular drums 44B and associated annular support 45B are in line with the electromagnet 18B and are secured to the core 80 and hence rotate with the core 80. The core 80 has an H-shape section, with a base member 82 having a central web 83 projecting radially to be sandwiched between the flanges 41A and 41B. Top members 84A and 84B complete the core 80. The top members 84A and 84B are on either side of the central web 83, and are also sandwiched between the flanges 41A and 41B. Other arrangements are considered as well, for instance the top members 84A and 84B being secured directly to the central web 83, the use of a monolithic core as an alternative to the embodiment shown, etc. As mentioned above, the annular supports 45A and 45B are secured to the core 80, between the base member 82 and the respective top members 84A and 84B. In the illustrated embodiment, the core 80 is part of the output casing 40 of the driven member 14, in addition to being part of the electromagnet unit 18.

When a current passes through the annular coil 81A, a magnetic field is produced in the appropriate side of the core 80 and through the intertwined arrangement of drums 24A and 44A and shear surfaces of the casing 40/core 80, with MR fluid 16 therebetween. Likewise, when a current passes though the annular coil 81B, a magnetic field is produced in the appropriate side of the core 80, and through the intertwined arrangement of drums 24B and 44B and shear surfaces of the casing 40/core 80, with MR fluid 16 therebetween. Each coil 81A and 81B may be redundant: two coils in one for increased reliability, as observed from FIGS. 2H and 2I. The magnetic fields may be produced separately (e.g., one of the electromagnets 18A and 18B at a time) or concurrently, with the same effect of causing a rotation of the core 80 and thus a rotation of the driven member 14. The magnetic field(s) therefore increase(s) the apparent viscosity of the MR fluid 16, to seize the drums 24A and 44A and/or the drums 24B and 44B, to cause a transmission of the rotational motion from the drums 24A and/or 24B to the drums 44A and/or 44B. The intertwined arrangement of drums 24A and 44A, and of drums 24B and 44B, allows the increase of the total clutch contact surface and of the clutch contact surface per volume of MR fluid 16. It is however considered to use a single drum 24A and a single drum 24B, to use the shear surfaces of the casing 40 (in the illustrated embodiment, the shear surfaces are part of the core 80) for transmission of force via the MR fluid 16. Indeed, any appropriate configuration by which one or more shear surfaces of the driving member 12 are separated from shear surfaces of the driven member 14 by an annular space filled with MR fluid 16 is suitable.

In operation, according to one exemplary embodiment, a power source (not shown) causes the driving member 12 to rotate. MR fluid 16 transmits at least some rotational energy (torque) to the driven member 14 by the application of a magnetic field by the electromagnet unit 18, thereby causing driven member 14 to rotate. The electromagnet unit 18 subjects MR fluid 16 to a magnetic field that, if varied, may change the apparent viscosity of MR fluid 16. Changing the apparent viscosity of MR fluid 16, in turn, may change the amount of rotational energy transferred from driving member 12 to driven member 14. Accordingly, in the example of the MR fluid clutch apparatus 10', the amount of rotational energy transferred to driven member 14 may be regulated by controlling the amount of magnetic field generated by the electromagnet unit 18.

An example of magnetic field F is shown in greater detail in FIG. 2H, and is schematically illustrated as being created by both electromagnets 18A and 18B. The clutch apparatus 10' may have a high reliability because of coil and fluid chamber redundancy. Indeed, the duplication of the sets of drum (set 24A/44A and set 24B/44B), and associated annular spaces (a.k.a., fluid chamber) filled with MR fluid 16 is a redundancy, with the motion of the driving member 12 transmittable to the driven member 14 by actuation of a single side of the electromagnets 18A and 18B. For example, in case of a coil failure as shown in FIG. 2I, the magnetic field generated by the coils may be on a single side of the electromagnet, as shown as F' as produced by electromagnet 18B. This unique feature may allow the clutch apparatus 10 to remain functional despite a coil failure. Likewise, leakage of the MR fluid 16 at one of the sides may not lead to failure of the clutch apparatus 10', as the other side may remain operational to transmit the motion, due to the isolation of the two chambers of MR fluid 16. In the example of FIGS. 2A-2F, the magnetic circuit low cross-section generation of and material composition may minimize the Eddy currents and allow a high dynamic response.

The embodiment illustrated in FIGS. 2A-2J is that of one degree of actuation (DOA) for one output degree of freedom (DOF), with one degree of transmission redundancy provided by the MR fluid clutch apparatus 10'. The embodiment shows an axial DOA (i.e., the driving member 12 receives power from an axially connected shaft) to an axial output DOF (an output shaft is to be connected to the driven member 14. However, the axial output DOF could readily be converted to an output DOF incorporating a radial connector, similar to the configuration shown in FIG. 3.

Figure 3:
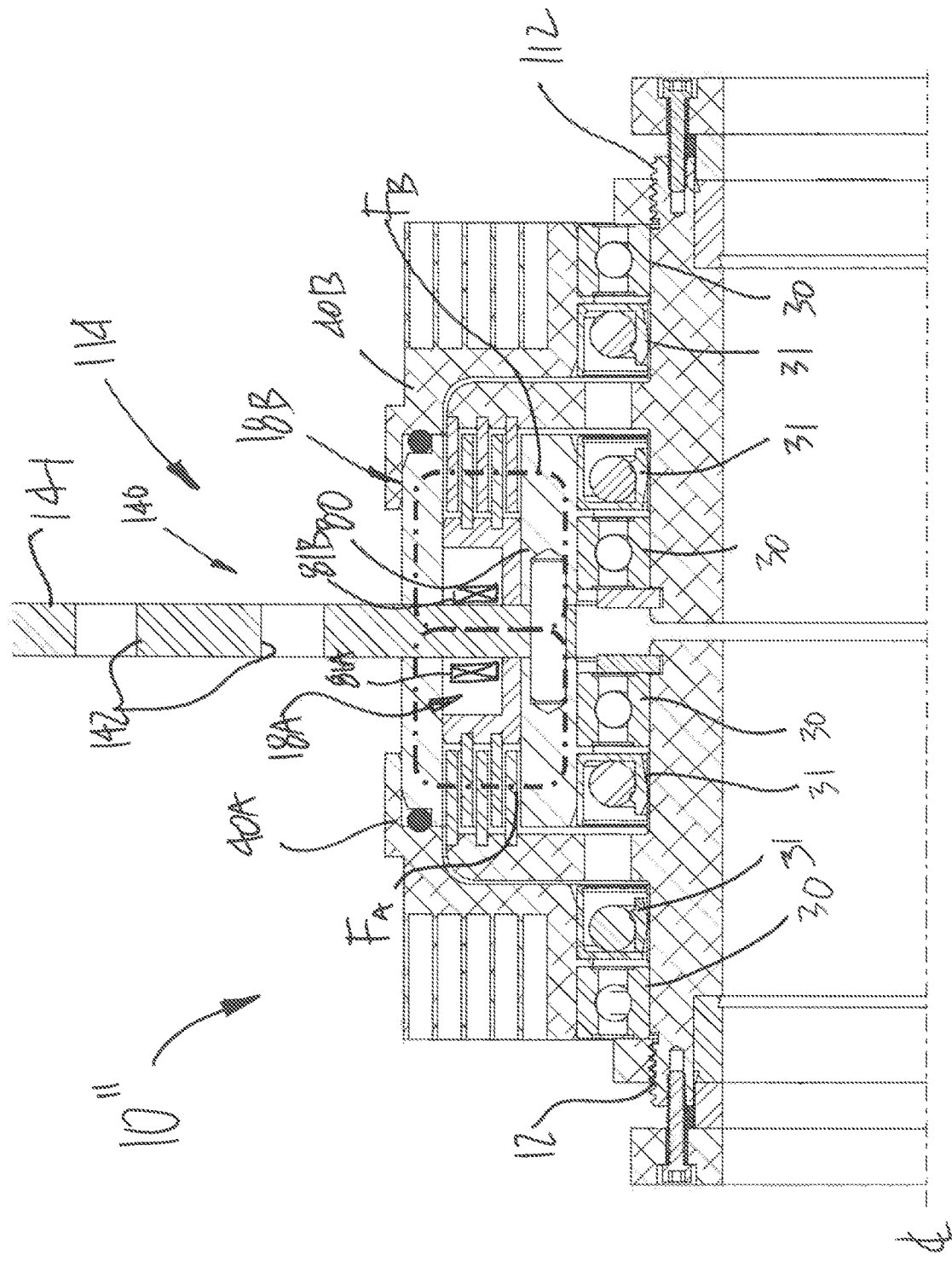
FIG. 3 is an MR fluid clutch apparatus in accordance with another embodiment of the present disclosure, with two independent axial inputs for a radial connector on the output.

Referring to FIG. 3, another embodiment of MR fluid clutch apparatus is shown as 10", and is also known as single MR fluid actuator. The MR fluid clutch apparatus 10" is similar to the MR fluid clutch apparatus 10' of FIGS. 2A-2F, whereby like components will bear like reference numerals. However, the MR fluid clutch apparatus 10" is configured to receive a driving input from two independent sources, namely the driving member 12 (as in FIG. 2A-2F), and the driving member 112. For example, the driving member 12 may provide a rotational input in a first orientation (e.g., clockwise), while the driving member 112 may provide a rotational input in the opposite orientation. Alternatively, the driving member 112 may provide a rotational input in the same orientation for a redundant power input, or may be a stator to provide some form of braking input.

In the MR fluid clutch apparatus 10", driven member 114 includes output casing 140, supported by bearings 30 so as to be rotatable about the axis CL as journaled by the driving members 12 and 112. The casing has the first annular half 40A and the second annular half 40B, with a flange or connector 141 projecting radially from the halves 40A and 40B. The output of the driven member 114 is provided through the connector 141, although other arrangements are possible as well. Hence, the connector 141 has bores 142, to connect the connector 141 to other equipment, components, linkages, etc.

Accordingly, the MR fluid clutch apparatus 10" is configured to have the driving members 12 and 112 share the core 80, although each of the electromagnets 18A and 18B could have their own cores. In FIG. 3, the electromagnet 18A produces a magnetic field $F_A$ that causes transmission of rotation from the driving member 12 to the driven member 114. The electromagnet 18B produces a magnetic field $F_B$ that causes transmission of rotation from the driving member 112 to the driven member 114. If either one of the driving members 12 and 112 is a stator, the related magnet field F would block movement of the driven member 14. In yet another example of FIG. 3, the magnetic field $F_A$ and $F_B$ could cause rotations in different orientations of the driven member 14 (clockwise and counterclockwise). It is pointed out that the controller operating the electromagnet unit 18 is programmed to avoid operating the electromagnets 18A and 18B in such a way that conflicting actuation is performed on the MR fluid clutch apparatus 10", and safety features may be provided to avoid damaging the MR fluid clutch apparatus 10".

The embodiment illustrated in FIG. 3 is that of two DOAs for one output DOF (clockwise output and counterclockwise output, or a redundant output of same orientation). The stator may be regarded as providing a DOA as it provides braking power.

Figure 4A:
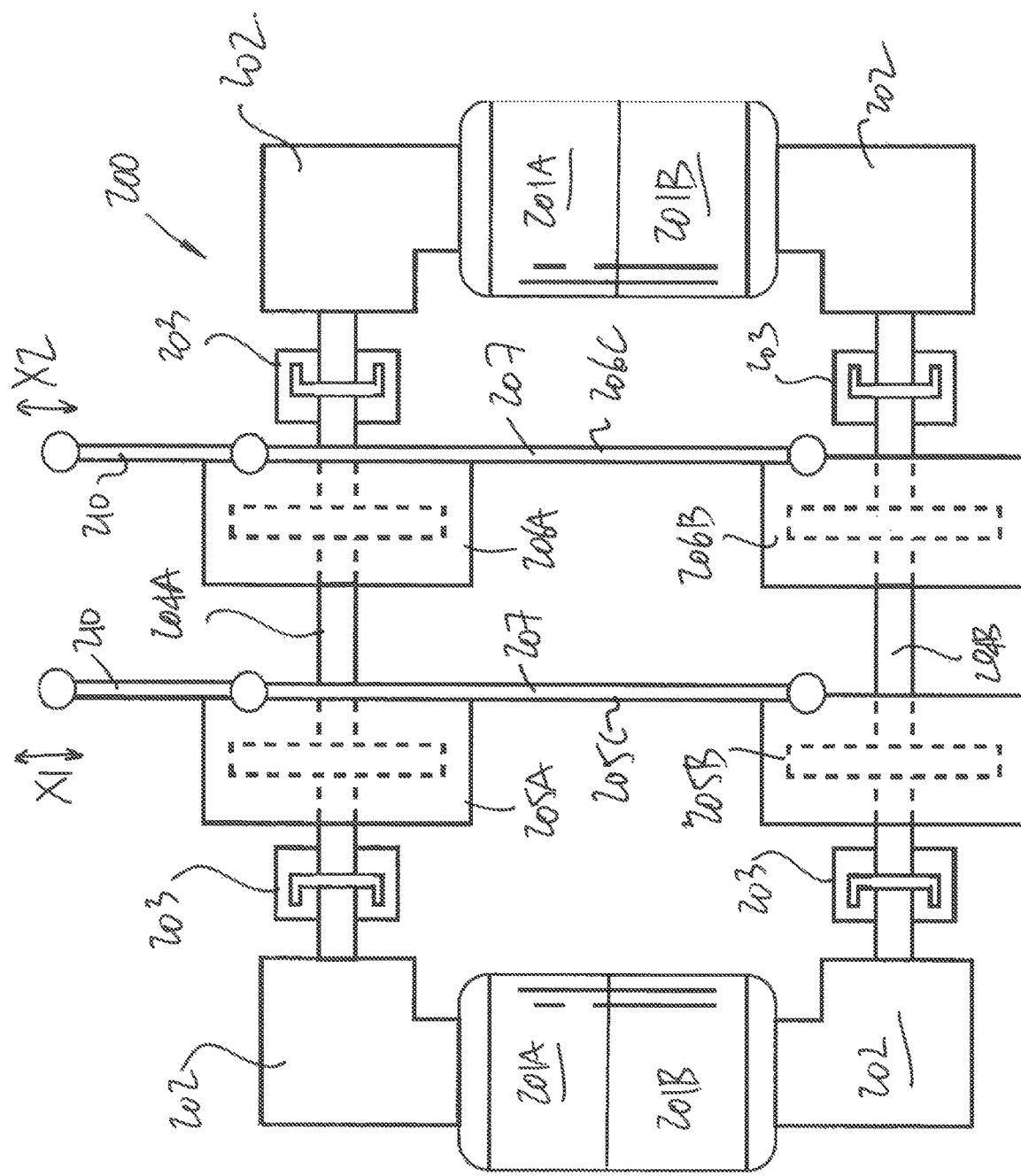
FIG. 4A is a schematic top view of a controlled-slippage actuation (CSA) system that incorporates MR fluid clutch apparatuses such as the MR fluid clutch apparatus of FIGS. 2A-2D.
Figure 4B:
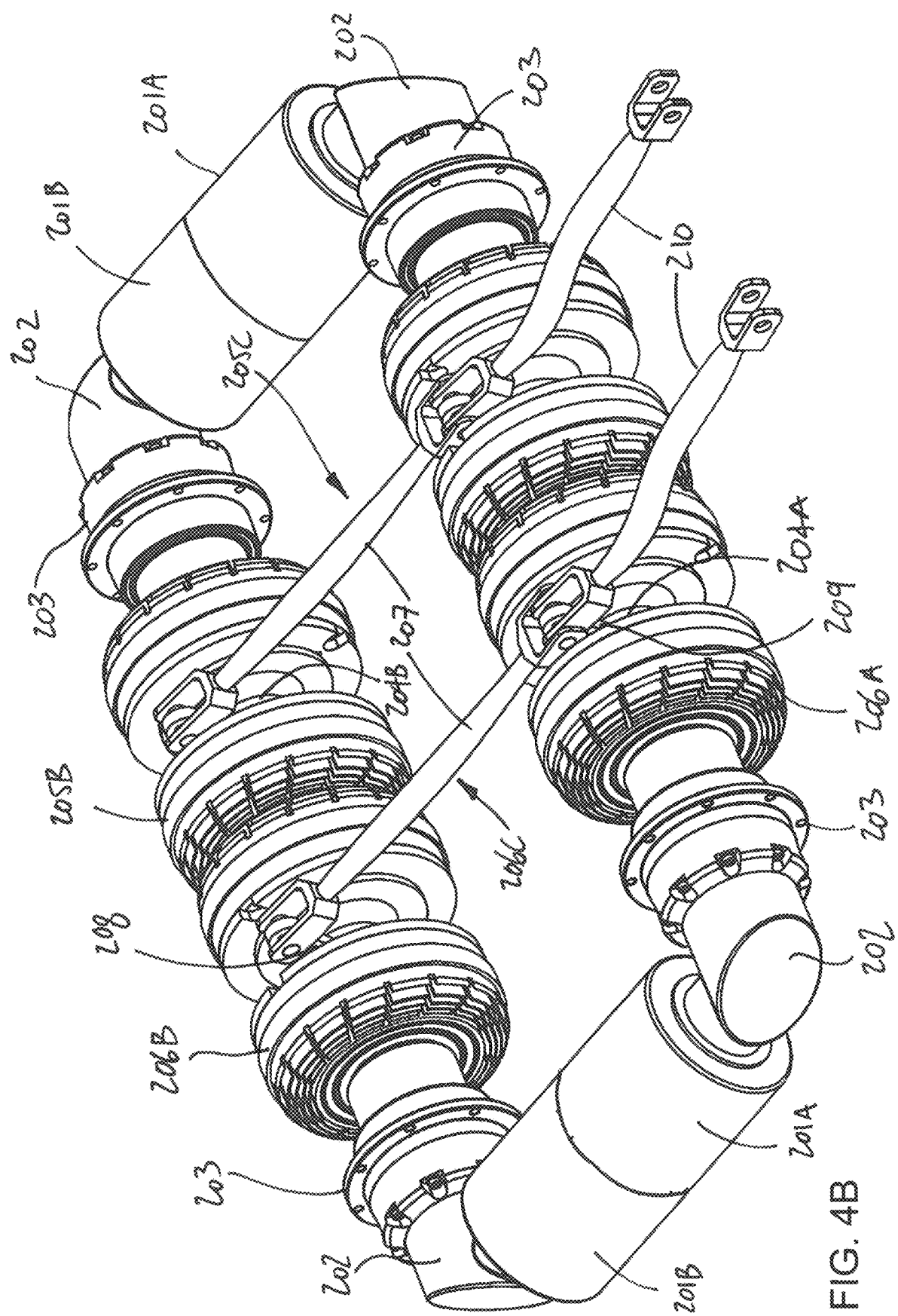
FIG. 4B is a perspective view of the CSA system of FIG. 4A.

The MR fluid clutch apparatuses such as those illustrated as 10, 10' and 10" in the preceding figures may be incorporated into a variety of different systems. For example, FIGS. 4A and 4B show a controlled-slippage actuation (CSA) system 200 according to one example embodiment. By controlled slippage, reference is made to the variation in apparent viscosity that can be achieved by controlling the magnetic field to which is exposed the MR fluid. Although not illustrated, controllers are connected to the electromagnets of the various embodiments having MR fluid clutch apparatuses as described herein, the controllers controlling the current sent to the electromagnets as a response to the transmission tasks required. For example, the controllers may be programmed with operation modules based on the intended use of the MR fluid clutch apparatuses in the CSAs.

FIG. 4A shows a schematic top view of CSA system 200, while FIG. 4B shows a perspective view of CSA system 200. The CSA system 200 may provide two control outputs, although additional control outputs could be produced by the addition of clutch apparatuses.

In the example of FIGS. 4A and 4B, the CSA system 200 features four rotary units defined by motors 201A and 201B, right-angle gearboxes 202 (or straight gear boxes for parallel motor orientation instead of the transverse orientation illustrated), unidirectional clutches 203, a clockwise-rotating shaft (CW shaft) 204A driven by either or both motors 201A, and a counterclockwise-rotating shaft (CCW shaft) 204B driven by either or both motors 201B. In the example of FIGS. 4A and 4B, motors 201A and 201B may rotate CW shaft 204A and CCW shaft 204B at substantially constant speeds but in opposite directions. In the example embodiment of FIGS. 4A-4B, motors 201 are high-speed electric motors, although other power sources may be included, such as hydraulic motors. In this example embodiment, unidirectional clutches 203 are provided to disconnect jammed motors 201/gearboxes 202 from CW shaft 204A and CCW shaft 204B. In the event of a jammed rotary unit, the unidirectional clutches 203 may be overrun by the redundant rotary unit, e.g., the other of the two motors 201A and gearboxes 202.

The CSA system 200 also has two pairs of MR fluid clutch apparatuses of the type shown as 10' in FIGS. 2A-2F, and labelled as 205A and 205B for a first pair, and 206A and 206B for a second pair, and two output linkage assemblies 205C and 206C, respectively coupled to the 205A/205B pair and the 206A/206B pair. Each pair of MR fluid clutch apparatus includes one MR fluid clutch apparatus coupled to CW shaft 204A and one MR fluid clutch apparatus coupled to CCW shaft 204B. Hence, a pair of two MR fluid clutch apparatuses receiving counterrotating inputs may allow the pair, in combination, to control the back and forth motion of their respective output linkage assemblies 205C and 206C, the back and forth motion being illustrated by X1 and X2, respectively. The output linkage assemblies 205C and 206C are four-bar mechanism, each featuring a summing bar 207 receiving mechanical inputs from two input bars 208 and 209 through appropriate rotational joints, the input bars 208 and 209 being the driven member of the clutch apparatuses. Hence, the input bars 208 and 209 cause output bar 210 to move in response. The output bar 210 is connected to a component, a system, an assembly, etc, that receives the motion transmitted by the output bar 210. The output bars 210 may be connected to different components, to a same component, etc.

In operation, according to the embodiment on FIGS. 4A and 4B, CW shaft 204A and CCW shaft 204B rotate in opposite directions. Each of the MR fluid clutch apparatuses 205A, 205B, 206A and 206B may transmit torque to its associated output linkage assembly (205C or 206C) in the rotational orientation of the driving shaft (204A or 204B), by varying the apparent viscosity of the MR fluid within the MR fluid clutch apparatus, for example, in the manner described in FIGS. 2A-2F of varying the electrical current provided in the coil of the electromagnet 18A and/or 18B). Hence, each of the 205A/205B pair and the 206A/206B pair is capable of producing force to its output linkage assembly (205C or 206C) in both directions. For example, providing a substantially larger amount of electrical current to the electromagnet of MR fluid clutch apparatus 206A than to the electromagnet of MR fluid clutch apparatus 206B may transmit torque at the output bar 210 in the clockwise direction at its junction with the input bar 209. Inversely, providing a substantially larger amount of electrical current to the electromagnet of MR fluid clutch apparatus 206B than to the electromagnet of MR fluid clutch apparatus 206A may transmit torque at the output bar 210 in the counter-clockwise direction at its junction with the input bar 209. In this manner, CSA system 200 may transmit control outputs provided through each output linkage assembly by changing the current provided to each MR fluid clutch apparatus.

The CSA system 200 may result in a reduction of maintenance operations and environmental impact, when used as an alternative to traditional hydraulic actuators performing the same movements at the same torque order of magnitude. Furthermore, the CSA system 200 may satisfy reliability standards by providing redundant components (e.g., multiple motors 201, gearboxes 202, component redundancy within each MR fluid clutch apparatus such as the pair of electromagnets 18A and 18B). Moreover, the MR fluid clutch apparatuses described herein have relatively few components, relatively few moving parts, and transfer torque through fluid rather than solid contact surfaces. In addition, the CSA system 200 may provide higher dynamic response than hydraulic and electromechanical actuators through inertia decoupling by the MR fluid clutch apparatuses and by the fast response time.

The embodiment illustrated in FIGS. 4A and 4B provides four DOAs for two output DOF with two degrees of actuation redundancy, or two DOAs (when two motors are present) and the two output DOFs (two clockwise/counter-clockwise output DOFs). It is even considered to provide four DOAs for one output DOF if the output bars 210 are interconnected, the system having three degrees of actuation redundancy. However, additional assemblies pairs of MR fluid clutch apparatuses could be added for supplemental output DOFs. Moreover, it is considered not to provide the two degrees of actuation redundancy, for example by having two motors instead of four, with each motor having two shaft ends to create the arrangement shown in FIGS. 4A-4B. Moreover, the combined power of paired motors 201A may be used to concurrently drive shaft 204A, and the combined power of paired motors 201B may be used to concurrently drive shaft 204B. This may enable the use of smaller motors.

Figure 5:
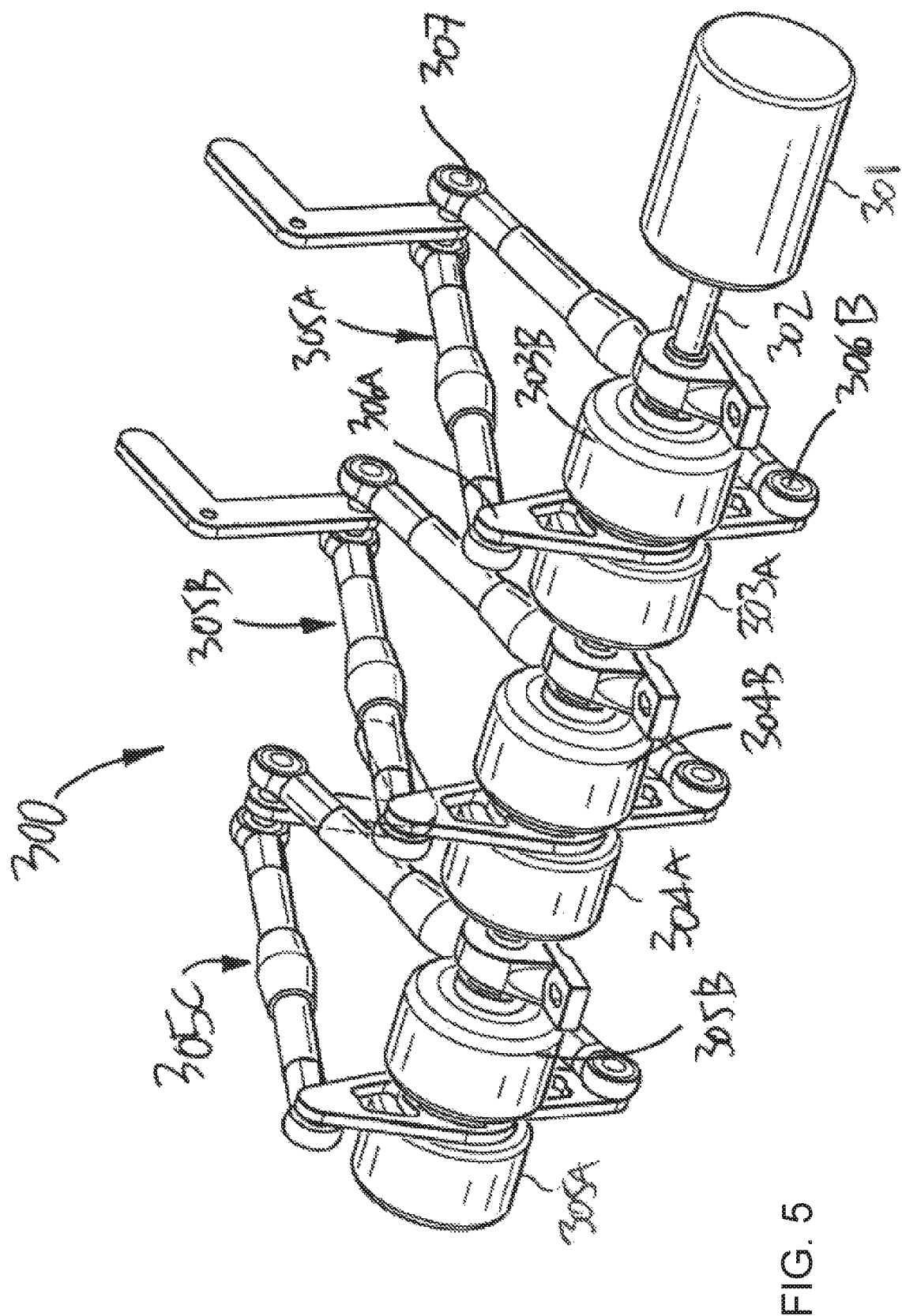
FIG. 5 is an alternative embodiment of a CSA system that incorporates MR fluid clutch apparatuses such as the MR fluid clutch apparatus of FIGS. 2A-2D.

As an alternative to the concept taught by the CSA system 200 employing multiple shafts, CSA system 300 of FIG. 5 considers providing bidirectional control with a single shaft. The CSA system 300 features a motor 301, a shaft 302, and three pairs of MR fluid clutch apparatuses 303A/B, 304A/B, 305A/B. Each pair of MR fluid clutch apparatuses is associated to a respective output linkage assembly 303C, 304C, 305C in a bell crank arrangement. Each pair comprises two MR fluid clutch apparatus, for example having a similar configuration to the MR fluid clutch apparatus 10 of FIG. 2A. Each MR fluid clutch apparatus has a dedicated output lever 306, with each of the pairs 303A/B, 304A/B, 305A/B having one lever pivot point above the longitudinal axis of the driving shaft 302 (see 306A), and the other lever pivot point below the longitudinal axis of the driving shaft 302 (see 306B). In this manner, torque transmitted in the clockwise direction by MR fluid clutch apparatus 303A results in torque in the clockwise direction at the output pivot point 307A of the linkage assembly 303C, whereas torque transmitted in the clockwise direction by MR fluid clutch apparatus 303B results in torque in the counter-clockwise direction at the output pivot point 307A. Hence, with a single shaft 302, the CSA 300 produces a reciprocating output movement for its output linkage assemblies 303C, 304C, 305C.

The embodiment illustrated in FIG. 5 is highly underactuated, with one DOA for, three output DOFs, via six degrees of transmission (six clutch apparatuses). The embodiment of FIG. 5 could have more or less output DOAs and DOFs.

Figure 6:
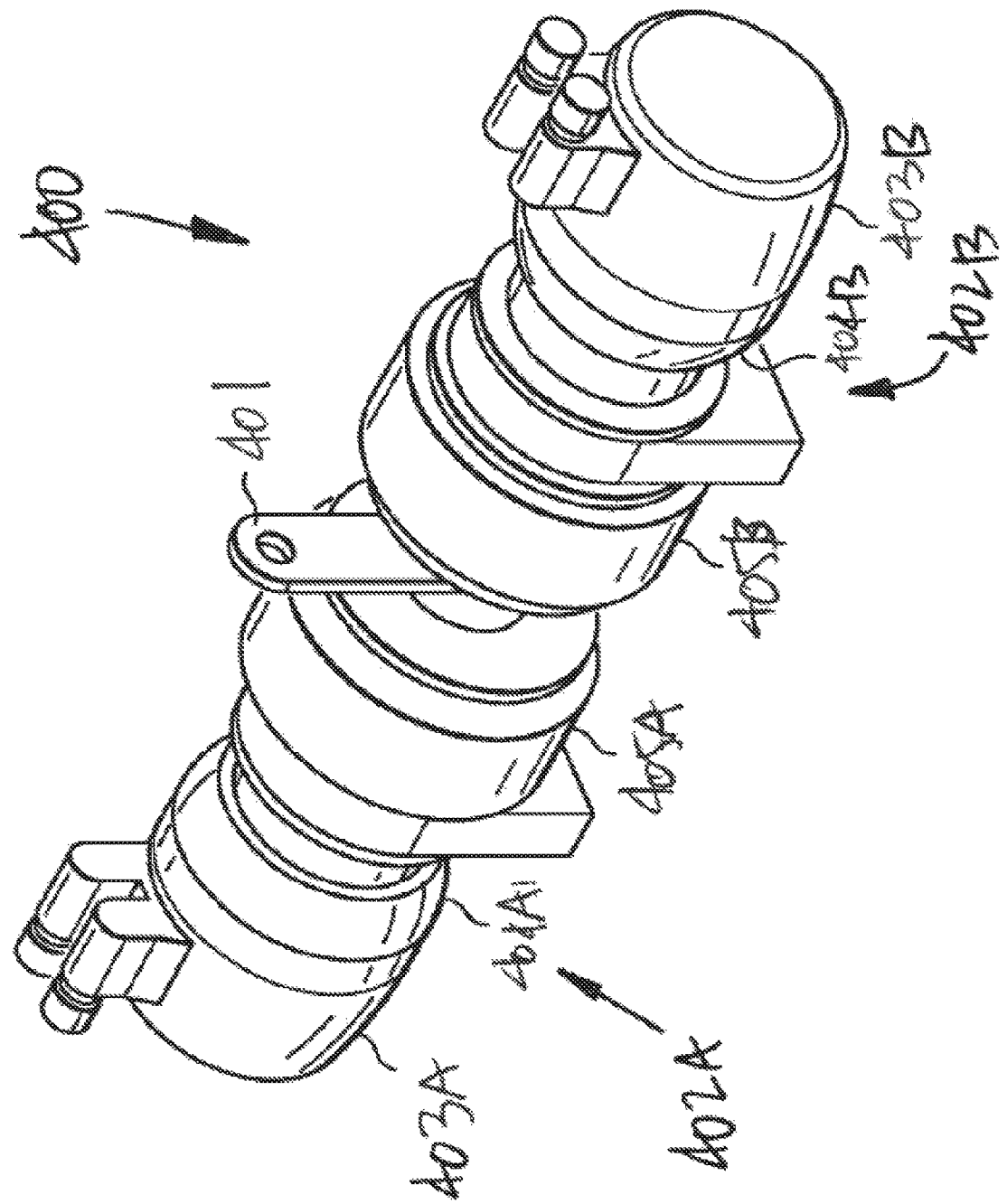
FIG. 6 is a perspective view of a clutch-redundant rotary motor (CRRM) system that incorporates MR fluid clutch apparatuses such as the MR fluid clutch apparatus of FIGS. 2A-2D.

In accordance to yet another embodiment illustrative of a potential use of the MR fluid clutch apparatuses of the present disclosure, FIG. 6 shows a clutch-redundant rotary motor (CRRM) system 400. The CRRM system 400 provides a mechanical output through linkage 401. In this example embodiment, the CRRM system 400 has rotary units 402A and 402B. The rotary units 402A and 402B have respective motors 403A and 403B, gearboxes 404A and 404B, and MR fluid clutch apparatus 405A and 405B, the MR fluid clutch apparatuses being similar in operation to the MR fluid clutch apparatus 10 of FIG. 2A, with redundant electromagnets.

In operation, according to one embodiment, motors 403A and/or 403B may provide mechanical energy to displace linkage 401. If, in one example scenario, motor 403A jams or otherwise fails to work properly, clutch 405A may disengage motor 403A and allow motor 403B to drive movement of linkage 401. The clutch 405A is disengaged by a change in the magnetic field provided to its MR fluid to create a decrease in apparent viscosity. In the example of FIG. 6, two motors are provided in the CRRM system 400 to provide a redundant motor. It is considered to provide a plurality of the CRRM systems 400 together to provide redundancy to a multi-output system.

The embodiment illustrated in FIG. 6 shows two DOAs for one output DOF with one degree of actuation redundancy. This may include an embodiment in which the motors 403A and 403B are both directional. Alternatively, the DOAs may provide opposite orientations.

Figure 7:
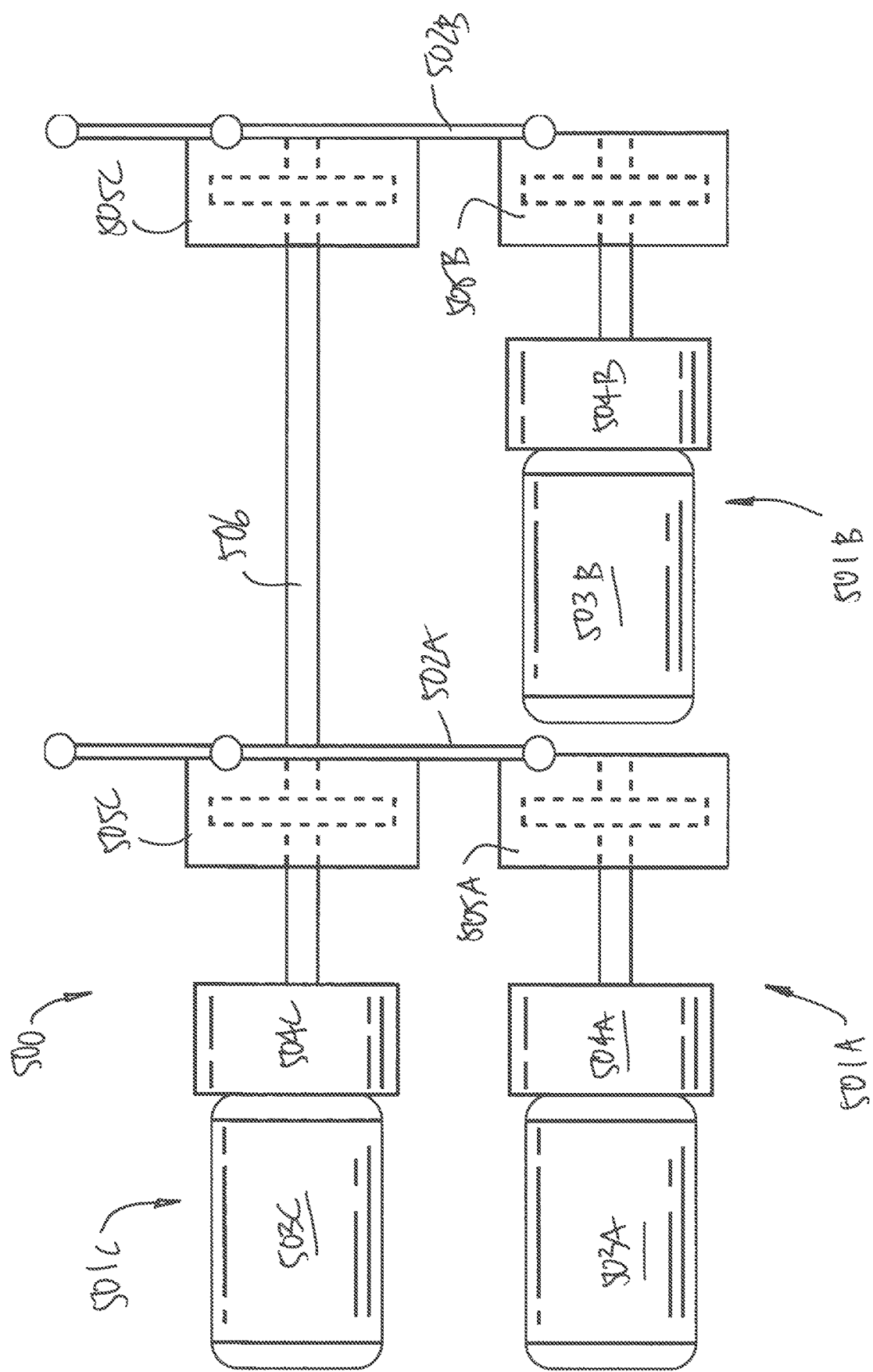
FIG. 7 is a schematic top view of an alternative embodiment of a CRRM system that incorporates MR fluid clutch apparatuses such as the MR fluid clutch apparatus of FIGS. 2A-2D.

Referring to FIG. 7, in accordance to yet another embodiment illustrative of a potential use of the MR fluid clutch apparatuses of the present disclosure, a CRRM system 500 is illustrated. The CRRM system 500 features two primary rotary units 501A and 501B, a shared rotary unit 501C; and linkages 502A and 502B. Each of the primary rotary units 501A/501B may include a single motor 503A/503B, gearbox 504A/504B, and MR fluid clutch apparatus 505A/505B. Shared rotary unit 501C also features a single motor 503C, a gearbox 504C, but an MR fluid clutch apparatus 505C for each of rotary units 501A and 501B. The MR fluid clutch apparatus 505C are on a drive shaft 506 driven by the single motor 503C via gearbox 504C. Linkage 502A couples the rotary unit 501A to the shared rotary unit 501C, whereas linkage 502B couples the rotary unit 501B to the shared rotary unit 501C.

In operation, according to an embodiment, the rotary unit 501A may drive linkage 502A, and the rotary unit 501B may drive linkage 502B. The rotary unit 501C may remain disengaged so long as rotary units 501A and 501B are operating properly. If, however, a failure occurs (e.g., the MR fluid clutch apparatus 505A or the gearbox 504A fails or the motor 503A), the MR fluid clutch apparatus 505A of rotary unit 501A may be disengaged, and the MR fluid clutch apparatus 505C may engage shared rotary unit 501C so as to allow shared rotary unit 501C to drive linkage 502A.

In this manner, the shared rotary unit 501C may be sufficient to provide redundancy to all two primary rotary units 501A and 501B in the event that one primary rotary unit fails. It is contemplated to extend the configuration of the CRRM system 500 to more than two primary rotary units, by sharing multiple rotary units with the shared rotary unit 501C.

Hence, in FIG. 7, the configuration shows DOAs for two output DOFs with one shared degree of actuation redundancy. The degree of actuation redundancy could be shared between more than two DOAs by adding rotary units.

What is claimed is:

1. An actuation system comprising:
    four power sources each producing one degree of rotational power;
    a first power shaft connected to two of the power sources for receiving the degrees of rotational power for rotating in a first orientation, with one of the two degrees of rotational power being redundant;
    a second power shaft connected to two other of the power sources for receiving the degrees of rotational power in a second orientation opposite to the first orientation, with one of the two degrees of rotational power being redundant;
    at least one magnetorheological fluid clutch apparatus on the first power shaft and actuatable to output at least partially rotational power in the first orientation received from the first power shaft;
    at least one magnetorheological fluid clutch apparatus on the second power shaft and actuatable to output at least partially rotational power in the second orientation received from the second power shaft; and
    at least one linkage connected to the magnetorheological fluid clutch apparatuses on the first power shaft and on the second power shaft to move reciprocatingly upon actuation of the magnetorheological fluid clutch apparatuses.

2. The actuation system according to claim 1, further comprising a plurality of the magnetorheological fluid clutch apparatuses on the first power shaft and on the second power shaft, with pairs of one magnetorheological fluid clutch apparatus on the first power shaft and one magnetorheological fluid clutch apparatus on the second power shaft being formed and interconnected by a respective one of the linkages.

3. The actuation system according to claim 1, further comprising unidirectional clutches between each of the power sources and a respective one of the power shafts.

4. The actuation system according to claim 1, further comprising right-angle gearboxes between each of the power sources and a respective one of the power shafts.

5. The actuation system according to claim 1, wherein the four power sources are produced by two motors, each motor having two drive shafts.

6. The actuation system according to claim 1, wherein the four power sources are produced by four motors.

7. An actuation system comprising:
    at least one power source producing one degree of rotational power;
    a power shaft connected to the power source for receiving the degree of rotational power for rotating in a first orientation;
    at least a pair of magnetorheological fluid clutch apparatuses on the power shaft and each actuatable to output at least partially rotational power received from the power shaft via an output arm; and
    at least one linkage having an output end, a first sublinkage extending from the output end to a first joint with the output arm of one of the magnetorheological fluid clutch apparatuses of the pair, a second sublinkage extending from the output end to a second joint with the output arm of the other of the magnetorheological fluid clutch apparatuses of the pair, the first joint and the second joint being on opposite sides of a plane passing through an axis of the power shaft and the output end; whereby the output end moves reciprocatingly upon actuation of the magnetorheological fluid clutch apparatuses.

8. The actuation system according to claim 7, further comprising a plurality of pairs of magnetorheological fluid clutch apparatuses, each said pair having one linkage, the pairs sharing the power shaft.

9. The actuation system according to claim 7, wherein the power source is a single motor.

10. An actuation system comprising:
    two rotary units, each rotary unit comprising:
        a power source producing one degree of rotational power;
        a magnetorheological fluid clutch apparatus receiving the rotational power from the power source and actuatable to output at least partially rotational power received from the power source; and
    at least a shared output arm connected to the magnetorheological fluid clutch apparatus of both of the rotary units, the shared output arm moving upon actuation of either or both of the magnetorheological fluid clutch apparatuses.

11. The actuation system according to claim 10, further comprising a gearbox in each of the rotary units between the power source and the magnetorheological fluid clutch apparatus.

12. The actuation system according to claim 10, wherein one of the rotary units causes a clockwise movement of the shared output arm, and the other of the rotary units causes a counterclockwise movement of the shared output arm.

13. The actuation system according to claim 10, wherein the power sources of each said rotary unit is a bidirectional power source.

14. An actuation system comprising:
- at least two independent rotary units, each rotary unit comprising:
  - a power source producing one degree of rotational power;
  - a magnetorheological fluid clutch apparatus receiving the rotational power from the power source and actuatable to output at least partially rotational power received from the power source;
  - a linkage connected to the magnetorheological fluid clutch apparatus to receive the output; and
- a shared rotary unit comprising:
  - a shared power source producing one degree of rotational power;
  - a power shaft receiving the rotational power from the shared power source;
  - a magnetorheological fluid clutch apparatus for each of the at least two independent rotary units, and receiving the rotational power from the shared power source and actuatable to output at least partially rotational power received from the shared power source;
  - wherein the linkages of each of the at least two independent rotary units is connected to a dedicated one of the magnetorheological fluid clutch apparatus of the shared rotary unit to receive rotational power from the shared rotary unit.

15. The actuation system according to claim 14, further comprising a gearbox in each of the rotary units between the power source and the magnetorheological fluid clutch apparatus.

16. The actuation system according to claim 14, wherein one of independent rotary units produce a clockwise rotation, and the shared rotary unit produces a counterclockwise rotation.

17. The actuation system according to claim 14, wherein the independent rotary units and the shared rotary unit all produce rotation in a common orientation, with the degree of rotational power of the shared rotary unit being redundant.

18. The actuation system according to claim 14, wherein the power source of at least one said rotary unit is a bidirectional power source.

* * * * *